US008510156B2

(12) United States Patent
Sakata et al.

(10) Patent No.: US 8,510,156 B2
(45) Date of Patent: Aug. 13, 2013

(54) VIEWING TERMINAL APPARATUS, VIEWING STATISTICS-GATHERING APPARATUS, VIEWING STATISTICS-PROCESSING SYSTEM, AND VIEWING STATISTICS-PROCESSING METHOD

(75) Inventors: Kotaro Sakata, Hyogo (JP); Kazuya Nomura, Osaka (JP); Tomohiro Konuma, Osaka (JP); Maki Yamada, Kanagawa (JP); Shigenori Maeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 12/958,442

(22) Filed: Dec. 2, 2010

(65) Prior Publication Data
US 2011/0209066 A1 Aug. 25, 2011

(30) Foreign Application Priority Data
Dec. 3, 2009 (JP) .................................. 2009-275112

(51) Int. Cl.
*G06F 3/14* (2006.01)
(52) U.S. Cl.
USPC ............... 705/14; 725/12; 725/146; 715/735; 705/10; 705/14.49; 705/14.66; 386/117
(58) Field of Classification Search
USPC ......... 715/200–277, 700–867; 700/701–866; 709/201–229; 345/30–111; 705/50–79
See application file for complete search history.

(56) References Cited

U.S. PATENT DOCUMENTS

| 2003/0126013 | A1* | 7/2003 | Shand ............................. 705/14 |
| 2007/0250901 | A1* | 10/2007 | McIntire et al. ............... 725/146 |
| 2008/0147488 | A1* | 6/2008 | Tunick et al. .................... 705/10 |
| 2009/0150155 | A1 | 6/2009 | Endo et al. |
| 2010/0014840 | A1* | 1/2010 | Nagai ........................... 386/117 |

(Continued)

FOREIGN PATENT DOCUMENTS

| JP | 2839855 | 12/1998 |
| JP | 2947289 | 9/1999 |

(Continued)

OTHER PUBLICATIONS

J. Satake et al., "Non-contact and Non-constraint Gaze Estimation for Interactive Information Display", National Institute of Information and Communications Technology, Kyoto University, 2007 (with partial English translation).

*Primary Examiner* — Ruay Ho
(74) *Attorney, Agent, or Firm* — Wenderoth, Lind & Ponack, L.L.P.

(57) ABSTRACT

Provided is a viewing terminal apparatus that can present an appropriate result of statistics on viewing of a content for diversified viewing modes. The viewing terminal apparatus includes: a category determining unit that determines, as a viewer category, a relationship between viewers who are viewing a content displayed on a display; a transmitting unit that transmits, to the viewing statistics-gathering apparatus, first viewing status information indicating the content that is being viewed by the viewers and the viewer category determined by the category determining unit, the content being associated with the viewer category; and a viewing statistics presenting unit that obtains viewing statistics information from the viewing statistics-gathering apparatus, and presents a result of statistics that is (i) indicated by the obtained viewing statistics information and (ii) a result of statistics on viewing of a content only by viewers who belong to a predetermined viewer category.

19 Claims, 23 Drawing Sheets

(56) References Cited

U.S. PATENT DOCUMENTS

| | | |
|---|---|---|
| 2010/0217743 A1 | 8/2010 | Ueki |
| 2011/0154385 A1* | 6/2011 | Price et al. ............ 725/12 |
| 2011/0238495 A1* | 9/2011 | Kang ............ 705/14.49 |
| 2012/0284126 A1* | 11/2012 | Giraud et al. ............ 705/14.66 |

FOREIGN PATENT DOCUMENTS

| | | |
|---|---|---|
| JP | 2962549 | 10/1999 |
| JP | 2002-006874 | 1/2002 |
| JP | 2003-153304 | 5/2003 |
| JP | 3454726 | 10/2003 |
| JP | 2005-142975 | 6/2005 |
| JP | 3886052 | 2/2007 |
| WO | 2008/126355 | 10/2008 |
| WO | 2009/041349 | 4/2009 |

* cited by examiner

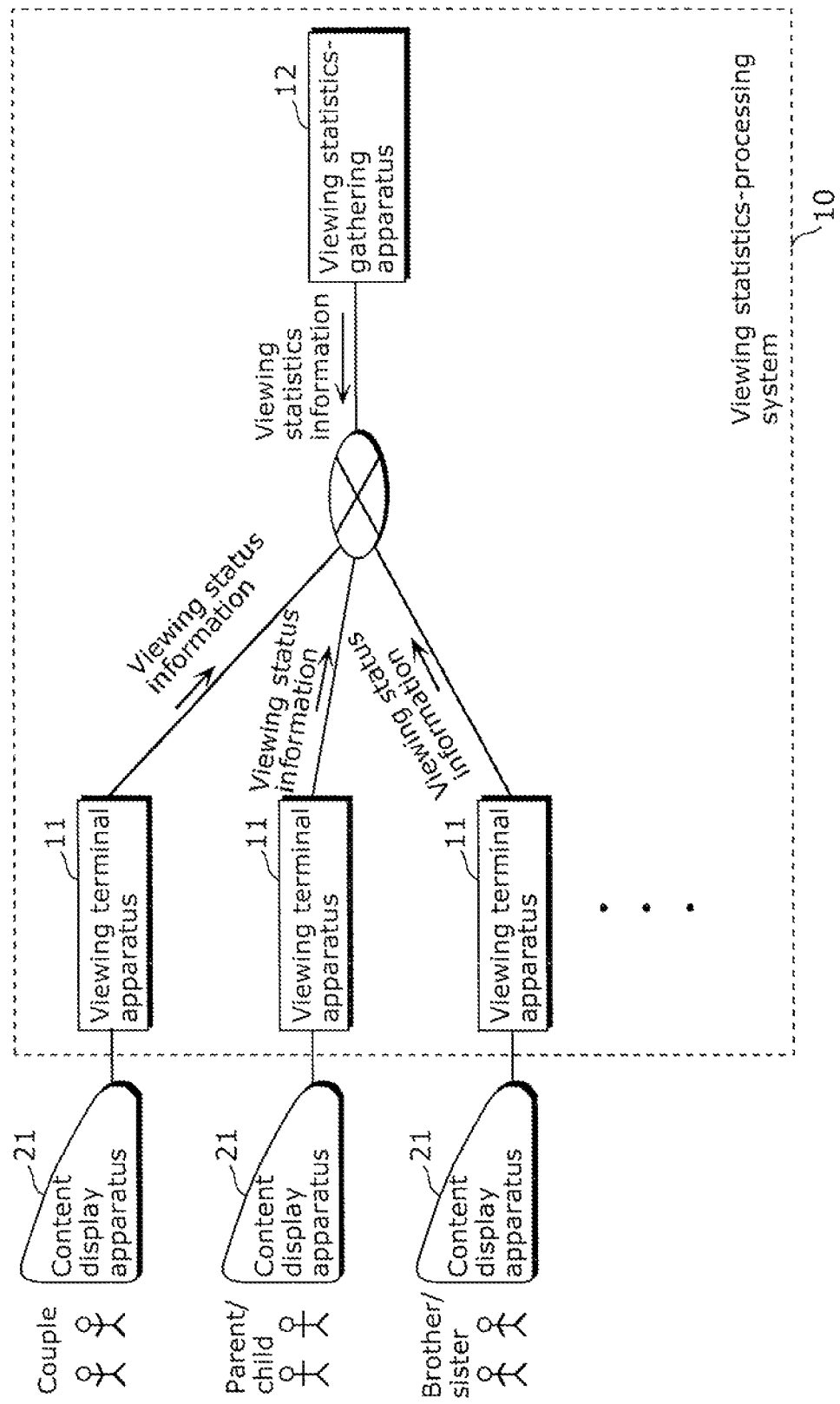

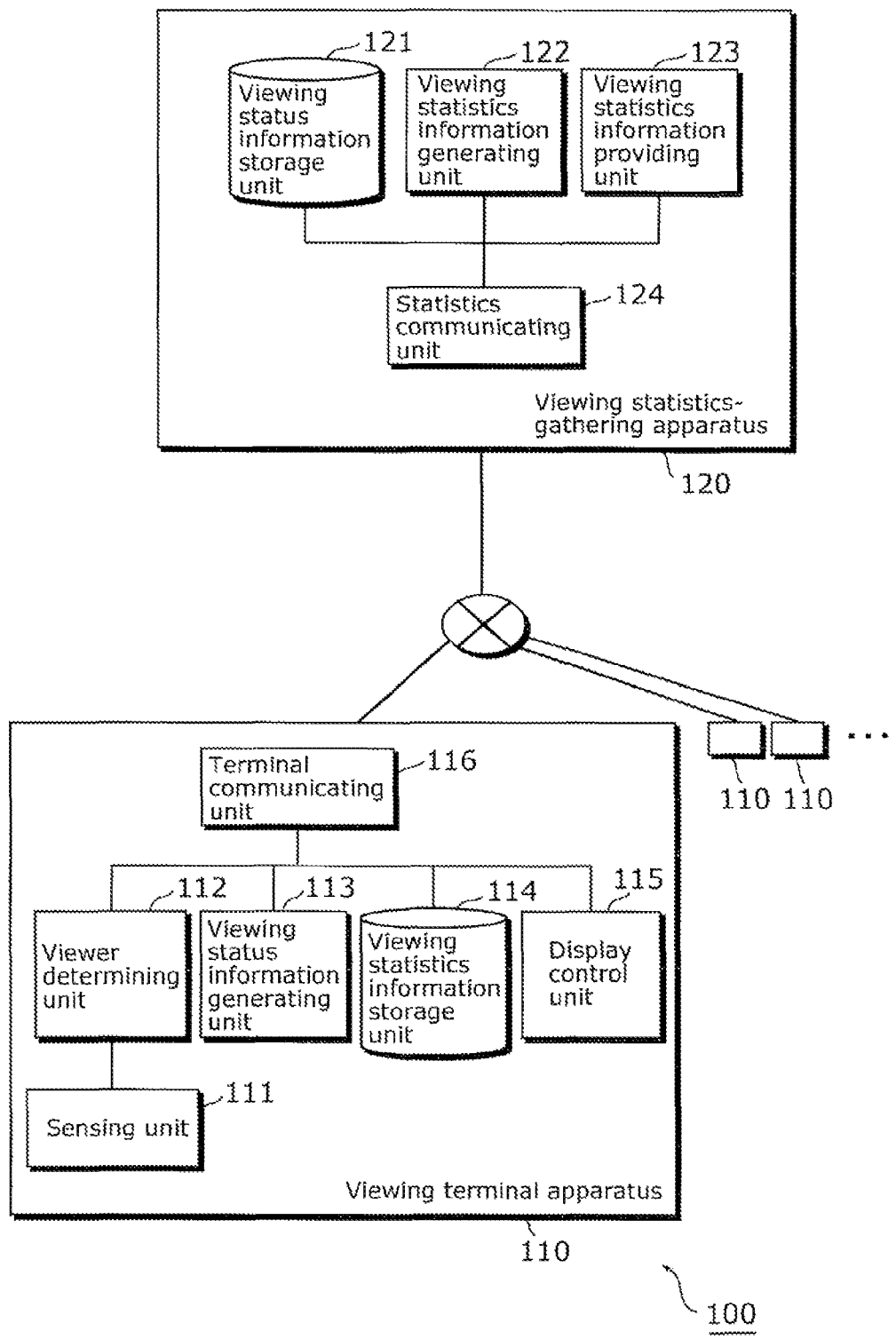

FIG. 6A

First viewing status information

| Viewer category | Social relationship | Parent/child |
| --- | --- | --- |
| | Intimacy degree | 85 |
| Content identification information | | XYZ |

FIG. 6B

Second viewing status information

| Viewer attribute | Gender | Male |
| --- | --- | --- |
| | Age | 40 |
| Content identification information | | ABC |

FIG. 7A

| Intimacy degree / Social relationship | 0 - 10 | 10 - 20 | 21 - 30 | 31 - 40 | 41 - 50 | 51 - 60 | 61 - 70 | 71 - 80 | 81 - 90 | 91 - 100 |
|---|---|---|---|---|---|---|---|---|---|---|
| Friend | A01 A02 A03 ... | B01 B02 B03 ... | C01 C02 C03 ... | D01 D02 D03 ... | ... | ... | ... | ... | ... | ... |
| Brother/sister | A11 A12 A13 ... | B11 B12 B13 ... | C11 C12 C13 ... | D11 D12 D13 ... | ... | ... | ... | ... | ... | ... |
| Parent/child | A21 A22 A23 ... | B21 B22 B23 ... | C21 C22 C23 ... | D21 D22 D23 ... | ... | ... | ... | ... | ... | ... |
| Couple | A31 A32 A33 ... | B31 B32 B33 ... | C31 C32 C33 ... | D31 D32 D33 ... | ... | ... | ... | ... | ... | ... |

Viewer category statistics information (viewing statistics information)

FIG. 7B

| Age / Gender | 0 - 9 | 10 - 19 | 20 - 29 | 30 - 39 | 40 - 49 | 50 - 59 | 60 - 69 | |
|---|---|---|---|---|---|---|---|---|
| Male | XA01<br>XA02<br>XA03<br>... | XB01<br>XB02<br>XB03<br>... | XC01<br>XC02<br>XC03<br>... | XD01<br>XD02<br>XD03<br>... | XE01<br>XE02<br>XE03<br>... | ⋮ | ⋮ | |
| Female | XA11<br>XA12<br>XA13<br>... | XB11<br>XB12<br>XB13<br>... | XC11<br>XC12<br>XC13<br>... | XD11<br>XD12<br>XD13<br>... | XE11<br>XE12<br>XE13<br>... | ⋮ | ⋮ | |

Viewer attribute statistics information (viewing statistics information)

VIEWING TERMINAL APPARATUS, VIEWING STATISTICS-GATHERING APPARATUS, VIEWING STATISTICS-PROCESSING SYSTEM, AND VIEWING STATISTICS-PROCESSING METHOD

BACKGROUND OF THE INVENTION (1) Field of the Invention

The present invention relates to (i) a viewing terminal apparatus that communicates information on viewing of contents including video, with a viewing statistics-gathering apparatus, (ii) a viewing statistics-gathering apparatus that gathers statistics on viewing of a content, and (iii) a viewing statistics-processing system including these apparatuses.

(2) Description of the Related Art

The audience rating is a result of statistics obtained by gathering information on viewing of contents, such as a television program. The producers and sponsors of contents use the audience rating as a barometer to measure the popularity of the contents. Furthermore, the viewers regard the top ranking of audience ratings as an indicator of trends of the general public.

The viewing statistics-processing system includes viewing terminal apparatuses and a viewing statistics-gathering apparatus. Each of the conventional viewing terminal apparatuses is connected to or included in a content display apparatus, such as a television receiver, and transmits a channel of a television program that is being displayed to the viewing statistics-gathering apparatus. The conventional viewing statistics-gathering apparatus automatically reads and sums the channels transmitted from the viewing terminal apparatuses to specify an audience rating for each television program. In other words, the conventional viewing statistics-gathering apparatus counts the number of viewing terminal apparatuses that have transmitted a channel for each channel, namely, for each television program, and specify the audience rating based on a result of the counting.

However, in the case where a television program is displayed on a content display apparatus in the conventional viewing statistics-processing system, even when the user does not view the television program (for example, doing other chores or sleeping), the user is counted as one of the viewers of the television program.

Thus, a television audience rating measuring instrument in Patent Reference 1 (Japanese Patent No. 2947289) corresponding to the viewing terminal apparatus can determine the exact number of viewers and whether or not a user actually watches a television program, by detecting the eyes of the user, in particular, the pupils of the user.

Furthermore, even when the user does not do other chores and the user views a television program, the user is not always interested in the television program. Although the user is not interested in the television program, he/she finds it troublesome to change the channel. Thus, he/she may view the television program regardless of his/her interest.

Here, Patent Reference 2 suggests an operation history transmission mobile terminal corresponding to the viewing terminal apparatus (see Japanese Patent No. 3886052). When the user operates the operation history transmission mobile terminal, the terminal transmits a face image of the user who is viewing an image of a television program or an image of the television program during the operation so as to be included in an operation record. More specifically, the operation history transmission mobile terminal measures a time period for which it is operated, generates and stores the operation record in which a result of the operation, the measured time period, and the image of the television program or the face image of the viewer are associated to one another, and transmits the operation record.

Furthermore, a viewer response information collecting system in Patent Reference 3 (Japanese Unexamined Patent Application Publication No. 2005-142975) corresponding to the viewing statistics-processing system collects viewer response data indicating responses of viewers to a content that is being reproduced (reproduction content). Furthermore, the system collects, from a user terminal, viewing data of the reproduction content that includes information on display-screen operation records. The viewer response information collecting system integrates the collected viewer response data and the viewing data in synchronization with each other, and generates viewing quality data indicating the user's qualitative responses to the reproduction content.

These audience ratings and the viewing quality (the user's qualitative responses) are information to be referred to as barometers mainly for the producers and sponsors of contents to measure the popularity of the contents. Furthermore, Patent Reference 4 suggests a system that presents the information to the viewers in real time to be referred to for selecting a content (for example, see Japanese Unexamined Patent Application Publication No. 2003-153304).

In the viewing-information providing system of Patent Reference 4 corresponding to the viewing statistics-processing system, a central apparatus corresponding to the viewing statistics-gathering apparatus provides viewing statistics-information to a broadcast receiver corresponding to the viewing terminal apparatus. The viewing statistics-information indicates, for example, the audience rating for each channel. Each viewer can understand the statistical position of the channel or the content that is being viewed by the viewer, using such a viewing-information providing system.

SUMMARY OF THE INVENTION

However, the viewing statistics-processing systems disclosed in Patent References 1 to 4 cannot present appropriate results of statistics on viewing of contents for diversified viewing modes.

The individual values have diversified, while the number of contents to be selected by viewers is increasing along with the development in multi-channels. As a result, the content viewing tendency showing which content (television program) viewers prefer to view have diversified in accordance with the gender, generation, family structure, and others of each viewer. The viewing modes of contents have also been diversified into, for example, an indoor viewing mode, an outdoor viewing mode, a mobile viewing mode, a stand-alone viewing mode, and a multiple viewing mode. Furthermore, the multiple viewing mode is, for example, a newly-married couple viewing mode, an older-couple viewing mode, a parent and child viewing mode, and a student-friends viewing mode. As a result, the viewing tendency differs to a greater or lesser extent, depending on which relationship the content viewing group has when the group views the content. Thus, the conventional audience ratings gathered from groups of people with various backgrounds and situations (result of statistics on viewing of contents) may be a valid indicator to some extent so as to roughly understand the viewing tendency of the mass (general public). However, the audience rating is becoming what many people can hardly agree.

Thus, the present invention has been conceived in view of the problems, and has an object of providing a viewing terminal apparatus, a viewing statistics-gathering apparatus, and a viewing statistics-processing system that are capable of presenting an appropriate result of statistics on viewing of a content to support the diversified viewing modes.

In order to achieve the object, the viewing terminal apparatus according to an aspect of the present invention is a viewing terminal apparatus that communicates, with a viewing statistics-gathering apparatus, information on viewing of a content, and includes: a category determining unit configured to determine, as a viewer category, a relationship between viewers who are viewing a content displayed on a display; a transmitting unit configured to transmit, to the viewing statistics-gathering apparatus, first viewing status information indicating the content that is being viewed by the viewers and the viewer category determined by the category determining unit, the content being associated with the viewer category; and a viewing statistics presenting unit configured to obtain viewing statistics information from the viewing statistics-gathering apparatus, and to present a result of statistics that is (i) indicated by the obtained viewing statistics information and (ii) a result of statistics on viewing of a content only by viewers who belong to a predetermined viewer category. For example, the result of statistics is displayed on the display.

Thereby, since the first viewing status information indicating the content that is being viewed and the viewer category that are associated with each other is transmitted to the viewing statistics-gathering apparatuses, upon receipt of the first viewing status information from each of the viewing terminal apparatuses, the viewing statistics-gathering apparatus can gather not statistics on viewing of the content by the mass (general public) but statistics on viewing of the content for each viewer category. For example, the viewing statistics-gathering apparatus can gather statistics for each viewer category, such as newly-married couple, older-couple, parent and child, and friend, based on the first viewing status information transmitted from each of the viewing terminal apparatuses. Furthermore, since the result of statistics is presented as a result of statistics on viewing of a content only by viewers who belong to a predetermined viewer category, the viewers who are viewing the content can know not a rough statistics result of the mass (general public) but a detailed statistics result of viewers having a predetermined relationship (for example, newly-married couple, older-couple, parent and child, or friend) among the mass (general public). Thus, the viewing terminal apparatus according to an aspect of the present invention can present an appropriate result of statistics on viewing of a content for the diversified viewing modes. In other words, compared to the conventional audience rating, information that can be a detailed reference can be provided to the viewers.

Moreover, the viewing terminal apparatus further includes: a number-of-persons determining unit configured to determine whether one or more than one viewer is viewing the content displayed on the display; and an attribute determining unit configured, when the number-of-persons determining unit determines that one viewer is viewing the content, to determine an attribute of the one viewer, wherein the transmitting unit is further configured to transmit, to the viewing statistics-gathering apparatus, second viewing status information indicating the content that is being viewed by the one viewer and the attribute of the one viewer determined by the attribute determining unit, the content being associated with the attribute, and the viewing statistics presenting unit is further configured to present a result of statistics that is (i) indicated by the obtained viewing statistics information and (ii) a result of statistics on viewing of a content only by viewers who belong to a predetermined attribute.

Thereby, when the number of viewers is one, since the second viewing status information indicating the content that is being viewed and an attribute of the viewer (viewer attribute, such as a man in his 30's, for example) that are associated with each other is transmitted to the viewing statistics-gathering apparatus, upon receipt of the second viewing status information from each of the viewing terminal apparatuses, the viewing statistics-gathering apparatus can gather not statistics on viewing of the content by the mass (general public) but statistics on viewing of the content for each viewer attribute. For example, the viewing statistics-gathering apparatus can gather statistics for each viewer category, such as the man in his 30's, based on the second viewing status information transmitted from each of the viewing terminal apparatuses. Thus, since the result of statistics is presented as a result of statistics on viewing of a content only by the viewers who belong to a predetermined viewer category, one of the viewers who is viewing the content can know not a rough statistics result of the mass (general public) but a detailed statistics result of viewers having a predetermined attribute (for example, male, female, or 30's) among the mass (general public). Thus, the viewing terminal apparatus according to an aspect of the present invention can present an appropriate result of statistics on viewing of a content for the diversified viewing modes.

Moreover, the viewing terminal apparatus further includes an obtaining unit configured to obtain at least one of images and voices of the viewers who are viewing the content displayed on the display, wherein the category determining unit is configured to determine the viewer category using the at least one of the images and the voices obtained by the obtaining unit.

Since the viewer category is determined using at least one of the images and voices obtained by the obtaining unit (sensing unit), the viewers do not have to perform the operation for determining a viewer category on the viewing terminal apparatuses. Thus, not only the usability can be improved, but also the erroneous determination of the viewer category by the misoperation can be prevented.

Furthermore, the category determining unit is configured to determine, as the viewer category, an intimacy degree between the viewers who are viewing the content displayed on the display.

Thereby, an appropriate result of statistics on viewing of a content can be presented for, for example, viewers whose intimacy degree is high or low. Thus, the viewers who are viewing a content can know a result of statistics corresponding to the intimacy degree to which the viewers belong or corresponding to any intimacy degree.

Furthermore, the category determining unit is configured to determine, as the viewer category, a variation in an intimacy degree between the viewers who are viewing the content displayed on the display.

Thus, an appropriate result of statistics on viewing of a content can be presented for, for example, viewers whose intimacy degree is high or low. Thus, the viewers who are viewing a content can know a result of statistics corresponding to a variation in intimacy degrees, when they desire to be on intimate terms with each other.

Furthermore, the category determining unit is configured to: specify at least one of a physical distance and a psychological distance between the viewers, based on the at least one of the images and the voices obtained by the obtaining unit; and calculate the intimacy degree using the at least one of the physical distance and the psychological distance that is specified.

Thereby, the intimacy degree can be appropriately determined based on a physical aspect and a psychological aspect.

For example, the category determining unit is configured to: count at least the number of occurrences that the viewers see each other face-to-face or the number of occurrences that the viewers gaze at each other, based on the images obtained by the obtaining unit; and calculate the intimacy degree using the counted number of occurrences as the psychological distance. Alternatively, the category determining unit is configured to: measure a time period for which the viewers are smiling, based on the images obtained by the obtaining unit; and calculate the intimacy degree using the measured time period as the psychological distance. As another alternative, the category determining unit is configured to: measure a time period for which the viewers are making a conversation, based on the voices obtained by the obtaining unit; and calculate the intimacy degree using the measured time period as the psychological distance.

Moreover, the category determining unit is configured to determine, as the viewer category, a social relationship between the viewers who are viewing the content displayed on the display.

Thereby, an appropriate result of statistics on viewing of a content can be presented for viewers who have a social relationship, for example, parent and child or brother and sister.

Moreover, the viewing terminal apparatus further includes an obtaining unit configured to obtain at least one of an image and a voice of the one viewer who is viewing the content displayed on the display, wherein the attribute determining unit is configured to: specify a variation in emotions of the one viewer, based on the at least one of the image and the voice obtained by the obtaining unit, and determine the specified variation in the emotions as an attribute of the one viewer. For example, the emotions are indicated by a first value representing joy, a second value representing anger, a third value representing sadness, and a fourth value representing enjoyment, and the attribute determining unit is configured to specify a variation in the first to fourth values as the variation in the emotions.

Thereby, an appropriate result of statistics on viewing of a content can be presented for a viewer whose emotions largely vary. Thus, when the viewer who is viewing a content displayed on the display desires to enjoy viewing a content, he/she can know a result of statistics of the content indicated by the fourth value that indicates enjoyment and has significantly increased.

Moreover, the viewing statistics presenting unit is configured to present, as the result of the statistics, a list of contents ranked in descending order of the number of times only the viewers who belong to the predetermined viewer category view the contents.

Thereby, since the contents are ranked and presented as a result of statistics, the visual recognition of the result can be improved.

Moreover, the viewing statistics presenting unit is configured to present the list of the contents that is the result of the statistics gathered from only the viewers who belong to the viewer category determined by the category determining unit.

Thereby, since a list corresponding to the viewer category to which the viewers who are viewing a content displayed on the display belong is presented to the viewers, a result of statistics on viewing of the content that is suitable for their viewing mode can be presented. The viewing terminal apparatus can present not only the viewer category determined by the category determining unit but also a result (list) of the statistics of any viewer category. Thereby, the viewers who are viewing a content can know a result of statistics of a viewer category in which the viewers are interested and which is different from their viewer category.

In order to achieve the object, the viewing statistics-gathering apparatus according to an aspect of the present invention is a viewing statistics-gathering apparatus that gathers statistics on viewing of a content, and includes: a receiving unit configured to receive, from each of viewing terminal apparatuses, viewing status information indicating a content that is being viewed by viewers and a viewer category indicating a relationship between the viewers, the content being associated with the viewer category; a viewing statistics information generating unit configured to generate viewing statistics information indicating a result of statistics on viewing of the content only by viewers who belong to a predetermined viewer category, based on the viewing status information of each of the viewing terminal apparatuses that is received by the receiving unit; and a providing unit configured to provide at least one of the viewing terminal apparatuses with the viewing statistics information generated by the viewing statistics information generating unit.

Thereby, since the viewing status information received from each of the viewing terminal apparatuses indicates the content that is being viewed and the viewer category that are associated with each other, the viewing statistics-gathering apparatus can gather not statistics on viewing of a content by the mass (general public) but statistics on viewing of a content for each viewer category. For example, the viewing statistics-gathering apparatus can gather statistics for each viewer category, such as newly-married couple, older-couple, parent and child, and friend, based on the viewing status information received from each of the viewing terminal apparatuses. Furthermore, since the viewing statistics information indicating a result of the statistics is provided to each of the viewing terminal apparatuses, the viewers who are viewing the content can know not a rough statistics result of the mass (general public) but a detailed statistics result of viewers having a predetermined relationship (for example, newly-married couple, older-couple, parent and child, or friend) among the mass (general public). Thus, the viewing statistics-gathering apparatus according to an aspect of the present invention can present an appropriate result of statistics on viewing of a content for the diversified viewing modes.

In order to achieve the object, the viewing statistics-processing system according to an aspect of the present invention is a viewing statistics-processing system including: a viewing statistics-gathering apparatus that gathers statistics on viewing of a content; and viewing terminal apparatuses that communicate information on viewing of a content with the viewing statistics-gathering apparatus, each of the viewing terminal apparatuses including: a category determining unit configured to determine, as a viewer category, a relationship between viewers who are viewing a content displayed on a display; a transmitting unit configured to transmit, to the viewing statistics-gathering apparatus, viewing status information indicating the content that is being viewed by the viewers and the viewer category determined by the category determining unit, the content being associated with the viewer category; and a viewing statistics presenting unit configured to obtain viewing statistics information from the viewing statistics-gathering apparatus, and to present a result of statistics that is (i) indicated by the obtained viewing statistics information and (ii) a result of statistics on viewing of a content only by viewers who belong to a predetermined viewer category, and the viewing statistics-gathering apparatus including: a receiving unit configured to receive the viewing status information from each of the viewing terminal apparatuses; a viewing statistics information generating unit configured to generate the viewing statistics information, based on the viewing status information of each of the viewing terminal apparatuses that is received by the receiving unit; and a providing unit configured to provide at least one of the viewing terminal apparatuses with the viewing statistics information generated by the viewing statistics information generating unit.

Although in the viewing statistics-processing system, the viewing terminal apparatus determines a viewer category, the viewing statistics-gathering apparatus may determine the viewer category.

In other words, the viewing statistics-processing system according to another aspect of the present invention is a viewing statistics-processing system including: a viewing statistics-gathering apparatus that gathers statistics on viewing of a content; and viewing terminal apparatuses that communicate information on viewing of a content with the viewing statistics-gathering apparatus, each of the viewing terminal apparatuses including: an obtaining unit (sensing unit) configured to obtain at least one of images and voices of viewers who are viewing a content displayed on a display, as a viewing status; a transmitting unit configured to transmit, to the viewing statistics-gathering apparatus, a viewing status information item indicating the content that is being viewed by the viewers and the viewing status obtained by the obtaining unit, the content being associated with the viewing status; and a viewing statistics presenting unit configured to obtain viewing statistics information from the viewing statistics-gathering apparatus, and to present a result of statistics that is (i) indicated by the obtained viewing statistics information and (ii) a result of statistics on viewing of a content only by viewers who belong to a predetermined viewer category, and the viewing statistics-gathering apparatus including: a receiving unit configured to receive, from each of the viewing terminal apparatuses, the viewing status information item; a category determining unit configured to determine the content indicated by the viewing status information item, for each of the viewing status information items received by the receiving unit, and determine, as a viewer category, a relationship between the viewers who are viewing the content displayed on the display, based on the viewing status indicated by the viewing status information item; a viewing statistics information generating unit configured to generate the viewing statistics information, based on the content and the viewer category corresponding to each of the viewing status information items of the viewing terminal apparatuses, the content and the viewer category being determined by the category determining unit; and a providing unit configured to provide at least one of the viewing terminal apparatuses with the viewing statistics information generated by the viewing statistics information generating unit.

The present invention can be implemented not only as such a viewing terminal apparatus, a viewing statistics-gathering apparatus, and a viewing statistics-processing system but also as a method of performing operations by these apparatuses and system, as a program causing a computer to execute the operations, as a recording medium on which the program is recorded, and as an integrated circuit. Furthermore, obviously, the program can be distributed by recording media, such as a CD-ROM or through transmission media, such as the Internet. Furthermore, any combination of the viewing terminal apparatus, the viewing statistics-gathering apparatus, and the viewing statistics-processing system may be accepted.

Furthermore, the present invention supports the diversification of viewers relating to televisions as described above, and also focuses on intrinsic value held by the televisions. In other words, the televisions provide places where families get together through viewing television programs. Not only the viewer can obtain information that has not yet been known through viewing a television program without visiting the actual spot, but also ties of viewers can deepen and their intimacy degree can be increased by viewing a television program together among viewers, such as a family, so that the details of the content open and promote a conversation, and that the viewers share emotions. In other words, the televisions play a role of making people become intimate and friendly. However, the viewers cannot obtain, from the conventional viewing terminal apparatus, information to be a source for understanding what kind of emotion arises from viewing the content (television program) or how the intimacy degree is changed when viewing it by viewers. The viewing terminal apparatus, the viewing statistics-gathering apparatus, and the viewing statistics-processing system according to an aspect of the present invention can solve such a problem.

Thus, the viewing terminal apparatus, the viewing statistics-gathering apparatus, and the viewing statistics-processing system can present an appropriate result of statistics on viewing of a content for the diversified viewing modes.

Further Information about Technical Background to This Application the disclosure of Japanese patent application no. 2009-275112 filed on Dec. 3, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a configuration of a viewing statistics-processing system according to an embodiment of the present invention;

FIG. 4 is a specific configuration of a viewing statistics-processing system according to an embodiment of the present invention;

FIG. 6A illustrates an example of viewing status information according to an embodiment of the present invention;

FIG. 6B illustrates another example of the viewing status information;

FIG. 7A illustrates an example of viewer category statistics information included in viewing statistics information according to an embodiment of the present invention;

FIG. 7B illustrates an example of viewer attribute statistics information included in the viewing statistics information;

DESCRIPTION OF THE PREFERRED EMBODIMENT

Figure 2A:
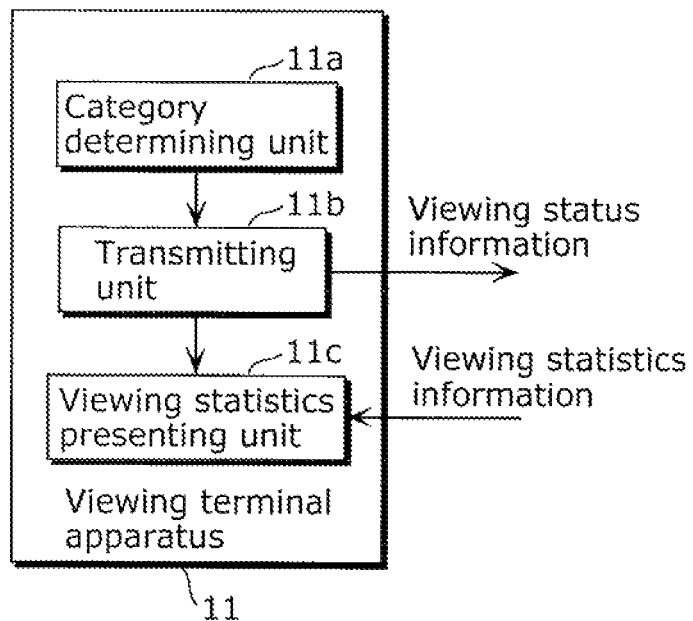
FIG. 2A is a block diagram illustrating a configuration of a viewing terminal apparatus according to an embodiment of the present invention.

The embodiment according to the present invention will be hereinafter described with reference to drawings.

FIG. 1 is a configuration of a viewing statistics-processing system according to the embodiment.

The viewing statistics-processing system 10 is a system that gathers statistics on viewing of contents, such as a television program, and presents a result of the statistics to each viewer. The viewing statistics-processing system 10 has an advantage that the statistics on viewing of contents can be appropriately presented according to the diversified viewing modes, and includes a viewing statistics-gathering apparatus 12 that gathers statistics on viewing of contents, and viewing terminal apparatuses 11 that communicate information on viewing of contents with the viewing statistics-gathering apparatus 12.

Each of the viewing terminal apparatuses 11 is connected to a content display apparatus 21, such as a television receiver, and transmits, to the viewing statistics-gathering apparatus 12 via a network, viewing status information (one of first viewing status information and second viewing status information) indicating a viewing status of a content displayed on the content display apparatus 21.

The viewing statistics-gathering apparatus 12 receives the viewing status information transmitted from each of the viewing terminal apparatuses 11, gathers statistics on viewing of each content based on the viewing status information, and generates viewing statistics information that is a result of the statistics.

Upon receipt of a request of the viewing statistics information from one of the viewing terminal apparatuses 11, the viewing statistics-gathering apparatus 12 transmits the viewing statistics information to the viewing terminal apparatus 11 that has issued the request. The viewing terminal apparatus 11 that has received the viewing statistics information causes the content display apparatus 21 to display the result of the statistics that is details of the viewing statistics information. In other words, the viewing terminal apparatus 11 presents the result of the statistics using the content display apparatus 21.

FIG. 2A is a block diagram illustrating a configuration of the viewing terminal apparatus 11.

The viewing terminal apparatus 11 is an apparatus that communicates information on viewing of contents with the viewing statistics-gathering apparatus 12, and includes a category determining unit 11a, a transmitting unit 11b, and a viewing statistics presenting unit 11c. The category determining unit 11a determines a relationship between viewers who are viewing a content displayed on a display (content display apparatus 21) as a viewer category. The transmitting unit 11b transmits, to the viewing statistics-gathering apparatus 12, the viewing status information (first viewing status information) indicating the content viewed by the viewers and the viewer category determined by the category determining unit 11a, where the content is associated with the viewer category. The viewing statistics presenting unit 11c obtains the viewing statistics information from the viewing statistics-gathering apparatus 12, and presents a result of statistics that is indicated by the obtained viewing statistics information and is a result of statistics on viewing of a content only by viewers belonging to a predetermined viewer category.

Figure 2B:
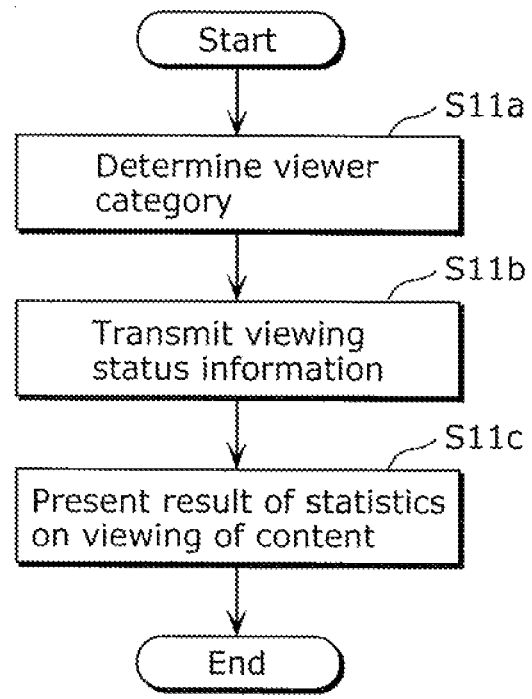
FIG. 2B is a flowchart of operations performed by the viewing terminal apparatus.

FIG. 2B is a flowchart of operations performed by the viewing terminal apparatus 11. In other words, the flowchart of FIG. 2B indicates a viewing processing method to be performed by the viewing terminal apparatus 11 for communicating information on viewing of contents with the viewing statistics-gathering apparatus 12.

First, the viewing terminal apparatus 11 determines a relationship between viewers who are viewing a content displayed on a display (content display apparatus 21) as a viewer category (Step S11a). Next, the viewing terminal apparatus 11 transmits, to the viewing statistics-gathering apparatus 12, the viewing status information (first viewing status information) indicating the content viewed by the viewers and the viewer category determined in Step S11a, where the content is associated with the viewer category (Step S11b). Furthermore, the viewing terminal apparatus 11 obtains the viewing statistics information from the viewing statistics-gathering apparatus 12, and presents a result of statistics that is indicated by the obtained viewing statistics information and is a result of statistics on viewing of a content only by viewers belonging to a predetermined viewer category (Step S11c).

Figure 3A:
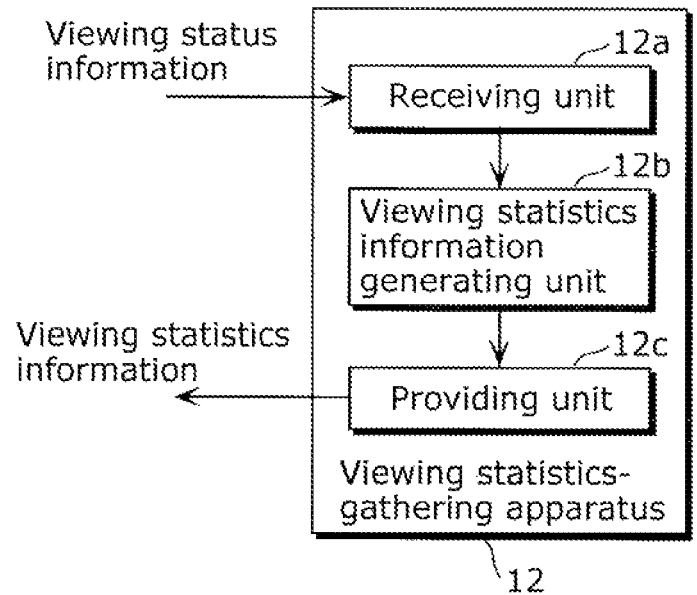
FIG. 3A is a block diagram illustrating a configuration of the viewing statistics-gathering apparatus.

FIG. 3A is a block diagram illustrating a configuration of the viewing statistics-gathering apparatus 12.

The viewing statistics-gathering apparatus 12 gathers statistics on viewing of contents, and includes a receiving unit 12a, a viewing statistics information generating unit 12b, and a providing unit 12c. The receiving unit 12a receives, from each of the viewing terminal apparatuses 11, the viewing status information indicating (i) the content that is displayed on a display (the content display apparatus 21) and is being viewed by viewers, and (ii) the viewer category indicating a relationship between the viewers, where the content is associated with the viewer category.

The viewing statistics information generating unit 12b generates the viewing statistics information indicating a result of statistics on viewing of the content only by the viewers belonging to a predetermined viewer category, based on the viewing status information of each of the viewing terminal apparatuses 11 that is received by the receiving unit 12a. The providing unit 12c provides the viewing statistics information generated by the viewing statistics information generating unit 12b to at least one of the viewing terminal apparatuses 11.

Figure 3B:
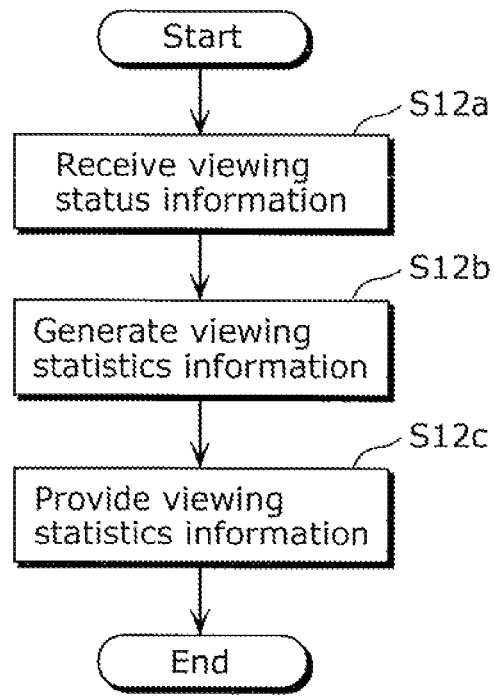
FIG. 3B is a flowchart of operations performed by the viewing statistics-gathering apparatus.

FIG. 3B is a flowchart of operations performed by the viewing statistics-gathering apparatus 12. In other words, the flowchart of FIG. 3B indicates a viewing statistics-gathering method of gathering statistics on viewing of a content by the viewing statistics-gathering apparatus 12.

First, the viewing statistics-gathering apparatus 12 receives, from each of the viewing terminal apparatuses 11, the viewing status information indicating (i) the content that is displayed on a display (the content display apparatus 21) and is being viewed by viewers, and (ii) the viewer category indicating the relationship between the viewers (Step S12a), where the content is associated with the viewer category. Next, the viewing statistics-gathering apparatus 12 generates the viewing statistics information indicating a result of statistics on viewing of the content only by the viewers belonging to a predetermined viewer category, based on the viewing status information of each of the viewing terminal apparatuses 11 that is received in Step S12a (Step S12b). Furthermore, the viewing statistics-gathering apparatus 12 provides the viewing statistics information generated in Step S12b to at least one of the viewing terminal apparatuses 11 (Step S12c).

The viewing statistics-processing system according to the embodiment will be hereinafter described in detail.

FIG. 4 is a specific configuration of a viewing statistics-processing system according to the embodiment.

A viewing statistics-processing system 100 includes viewing terminal apparatuses 110 and a viewing statistics-gathering apparatus 120. The viewing statistics-processing system 100 corresponds to the viewing statistics-processing system 10 in FIG. 1, the viewing terminal apparatuses 110 correspond to the viewing terminal apparatuses 11 in FIGS. 1 and 2A, and the viewing statistics-gathering apparatus 120 corresponds to the viewing statistics-gathering apparatus 12 in FIGS. 1 and 3A.

The viewing statistics-gathering apparatus 120 is connected to the viewing terminal apparatuses 110 via, for example, the Internet.

Each of the viewing terminal apparatuses 110 is connected to the content display apparatus 21 as the viewing terminal apparatus 11, and includes a sensing unit 111, a viewer determining unit 112, a viewing status information generating unit 113, a viewing statistics information storage unit 114, a display control unit 115, and a terminal communicating unit 116. The content display apparatus 21 receives at least one of a terrestrial broadcast, a satellite broadcast, a cable television broadcast, and an Internet television broadcast in order to obtain contents, such as a television program.

The sensing unit 111 is, for example, a capturing apparatus (camera), and captures an image of a predetermined range. When a user (person) is in the predetermined range, the user can view the content displayed on the content display apparatus 21 as a viewer. Thus, when the content is displayed on the content display apparatus 21 and one or more than one viewer is viewing the content, the sensing unit 111 captures an image of at least one viewer. In the embodiment, the sensing unit 111 is an obtaining unit that obtains a captured image (image) of one or more than one viewer who is viewing the content displayed on the content display apparatus 21 (display).

The viewer determining unit 112 determines whether or not the captured image obtained by the sensing unit 111 includes a human figure, that is, an image of a viewer. When determining that the captured image includes an image of a viewer, the viewer determining unit 112 further determines whether one or more than one viewer is included in the image. When determining that one viewer is included in the image, the viewer determining unit 112 determines the attribute (viewer attribute) of the viewer. Furthermore, when determining that more than one viewer is included in the image, the viewer determining unit 112 determines a viewer category of the viewers included in the captured image. The viewer determining unit 112 in the embodiment functions as a number-of-persons determining unit that determines whether one or more than one viewer is viewing the content displayed on the content display apparatus 21 (display), and also as an attribute determining unit that determines, when the number-of-persons determining unit determines that one viewer is viewing the content, an attribute of the one viewer who is viewing the content.

The viewing status information generating unit 113 generates the viewing status information. The viewing status information includes content identification information for identifying the content displayed on the content display apparatus 21, and viewer information indicating one of a viewer attribute and a viewer category determined by the viewer determining unit 112. The content identification information and the viewer information are associated with each other. The viewing status information including the content identification information and the viewer information indicating a viewer category corresponds to the first viewing status information. In addition, the viewing status information including the content identification information and the viewer information indicating a viewer attribute corresponds to the second viewing status information.

The terminal communicating unit 116 communicates with the viewing statistics-gathering apparatus 120. More specifically, the terminal communicating unit 116 transmits, to the viewing statistics-gathering apparatus 120, the viewing status information (first or second viewing status information) generated by the viewing status information generating unit 113. Furthermore, the terminal communicating unit 116 transmits a request message to the viewing statistics-gathering apparatus 120 based on an instruction from the display control unit 115. The request message is a message for requesting the viewing statistics-gathering apparatus 120 to issue the viewing statistics information. The terminal communicating unit 116 receives the viewing statistics information transmitted from the viewing statistics-gathering apparatus 120, in response to the request message, and stores the viewing statistics information in the viewing statistics information storage unit 114.

The viewing statistics information storage unit 114 is a recording medium having an area for recording the viewing statistics information, such as a memory and a hard disk.

Upon receipt of an operation (statistics display operation) from a viewer, the display control unit 115 instructs the terminal communicating unit 116 to transmit the request message according to the operation. Furthermore, when the viewing statistics information is stored in the viewing statistics information storage unit 114, the display control unit 115 reads the viewing statistics information, and causes the content display apparatus 21 connected to the viewing terminal apparatus 110 to display details of the viewing statistics information (a result of statistics on viewing of a content).

Here, in FIG. 4, the viewer determining unit 112 of the viewing terminal apparatus 110 corresponds to the category determining unit 11*a* of the viewing terminal apparatus 11 in FIG. 2A, the terminal communicating unit 116 of the viewing terminal apparatus 110 corresponds to the transmitting unit 11*b* of the viewing terminal apparatus 11 in FIG. 2A, the display control unit 115 of the viewing terminal apparatus 110 corresponds to the viewing statistics presenting unit 11*c* of the viewing terminal apparatus 11 in FIG. 2A.

The viewing statistics-gathering apparatus 120 includes a viewing status information storage unit 121, a viewing statistics information generating unit 122, a viewing statistics information providing unit 123, and a statistics communicating unit 124.

The statistics communicating unit 124 receives the viewing status information (first or second viewing status information) from each of the viewing terminal apparatuses 110, and stores the plurality of viewing status information in the viewing status information storage unit 121. Furthermore, the statistics communicating unit 124 transmits the viewing statistics information to each of the viewing terminal apparatuses 110, in response to an instruction from the viewing statistics information providing unit 123.

The viewing status information storage unit 121 is a recording medium having an area for recording a plurality of viewing status information, such as a memory and a hard disk.

The viewing statistics information generating unit 122 generates the viewing statistics information based on the plurality of viewing status information stored in the viewing status information storage unit 121. The viewing status information includes the content identification information and the viewer information that are associated with each other as described above. Here, the viewing statistics information generating unit 122 gathers statistics on viewing of a content only by viewers belonging to a viewer category or a viewer attribute indicated by the viewer information, for each viewer category or the viewer attribute. The viewing statistics information indicates a result of the statistics.

For example, the viewing statistics information generating unit 122 counts the number of groups of viewers who have viewed a predetermined content and belong to a predetermined viewer category. The viewing statistics information generating unit 122 counts the number of groups for each combination of a content and a viewer category. Then, the viewing statistics information generating unit 122 ranks, for each viewer category, contents in descending order of the number of groups of the viewers who have viewed the content. Similarly, the viewing statistics information generating unit 122 counts the number of viewers who have viewed the predetermined content and belong to a predetermined viewer attribute. The viewing statistics information generating unit 122 counts the number of viewers for each combination of a content and a viewer attribute. Then, the viewing statistics information generating unit 122 ranks the contents in descending order of viewers who have viewed the contents, for each viewer attribute. The viewing statistics information generating unit 122 generates the viewing statistics information indicating a result of the statistics of the contents (content identification information) ranked for each viewer category or viewer attribute.

The viewing statistics information providing unit 123 holds the viewing statistics information generated by the viewing statistics information generating unit 122. When the statistics communicating unit 124 receives a request message of the viewing statistics information from a corresponding one of the viewing terminal apparatuses 110, the viewing statistics information providing unit 123 instructs the statistics communicating unit 124 to transmit the viewing statistics information to the viewing terminal apparatus 110. The viewing statistics information providing unit 123 instructs the statistics communicating unit 124 to transmit the viewing statistics information to the corresponding one of the viewing terminal apparatuses 110 that has issued the request message.

Figure 5A:
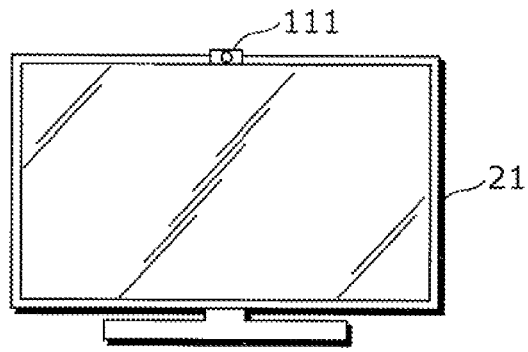
FIG. 5A illustrates an example of a position where a sensing unit according to an embodiment of the present invention is placed.
Figure 5B:
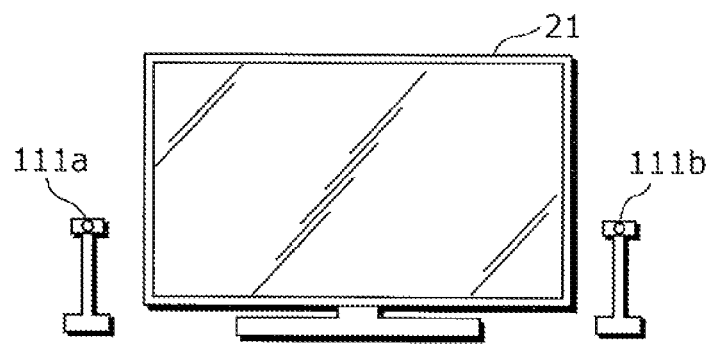
FIG. 5B illustrates another example of positions where the sensing units are placed.
Figure 5C:
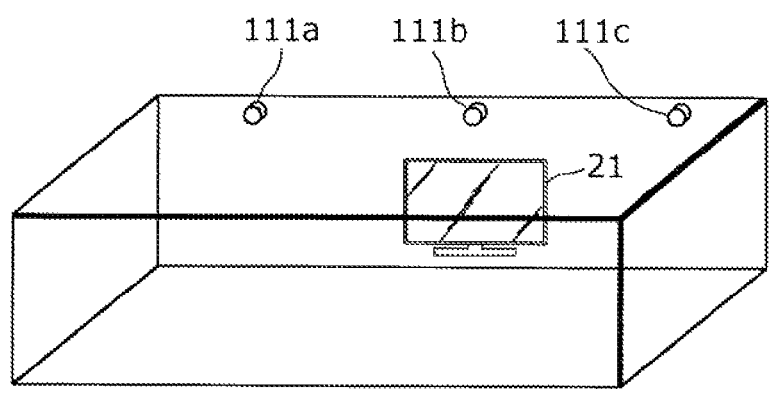
FIG. 5C illustrates another example of positions where the sensing units are placed.

FIGS. 5A to 5C illustrate examples of positions at each of which the sensing unit 111 is placed.

For example, as illustrated in FIG. 5A, when the sensing unit 111 is one camera, the sensing unit 111 is placed at the center of the top edge of the content display apparatus 21. Furthermore, as illustrated in FIG. 5B, when the sensing unit 111 includes two cameras 111*a* and 111*b*, the two cameras 111*a* and 111*b* are placed to sandwich the content display apparatus 21 at a distance therefrom. Furthermore, as illustrated in FIG. 5C, when the sensing unit 111 includes three cameras 111*a*, 111*b*, and 111*c*, the three cameras 111*a*, 111*b*, and 111*c* are horizontally placed above the content display apparatus 21 at a distance therefrom, in a space where the content display apparatus 21 is placed.

The following will describe, in detail, (1) determination of a viewer attribute and a viewer category and generation of viewing status information, (2) generation of viewing statistics information, and (3) presentation of the viewing statistics information.

First, the determination of a viewer attribute and a viewer category and generation of viewing status information will be described.

The viewer determining unit 112 of the viewing terminal apparatus 110 determines whether or not a captured image includes a face area, and determines one of a viewer attribute and a viewer category by pattern matching between an image of the facial area and a pre-registered face image. Here, the captured image is an image including frames generated by continuously capturing images. The face area is an area including an image of a human face.

More specifically, when determining whether or not the captured image includes a face area, the viewer determining unit 112 determines, for each frame, whether or not the captured image includes an area (skin color area) including pixels indicating the skin color of a person in a predetermined color space, based on the skin color, for example. Then, when determining that the captured image includes the skin color area, the viewer determining unit 112 extracts the skin color area, and calculates an inter-frame difference between frames in the skin color area. Here, the inter-frame difference is a difference sum of absolute values of pixel values in skin color areas extracted from two continuous frames. The viewer determining unit 112 determines whether or not the inter-frame difference exceeds a threshold. When determining that the inter-frame difference is equal to or lower than the threshold, the viewer determining unit 112 determines that the skin color area is not a face area, that is, that the captured image does not include a face area. Here, when determining that the inter-frame difference exceeds the threshold, the viewer determining unit 112 determines that the skin color area is a face area, that is, that the captured image includes a face area. In other words, the viewer determining unit 112 determines whether or not the captured image includes a face area, based on the presence of an image including pixels having a predetermined skin color, and on the motion in the image.

Furthermore, the viewer determining unit 112 determines whether one or more than one viewer is viewing the content by determining whether or not one frame includes face areas.

When determining that one viewer is viewing the content, the viewer determining unit 112 determines the viewer attribute of the one viewer by pattern matching between the image of the face area and each pre-registered face image in a memory as described above. The viewer attribute according to the embodiment is the gender and age (generation) of each viewer. The memory records (registers), in advance, face images, viewer attributes, and relationship attributes to be described later, and the viewer attributes and the relationship attributes are associated with the face images one another. When determining that a similarity between an image of a face area and a pre-registered face image exceeds a threshold, the viewer determining unit 112 determines the viewer attribute of the viewer by reading the viewer attribute associated with the pre-registered face image from the memory. The viewer determining unit 112 may estimate a viewer attribute, such as the gender and generation, by applying the pattern recognition method to the image of the face area. For example, Patent Reference 5 ("PHYSICAL PROPERTY VALUE ESTIMATING SYSTEM, AGE ESTIMATING SYSTEM, GENDER ESTIMATING SYSTEM, AGE/GENDER ESTIMATING SYSTEM, AND PHYSICAL PROPERTY VALUE ESTIMATING METHOD", International Publication WO 2009/041349) discloses the technique for estimating an attribute, such as the gender and generation, from an image.

When determining that more than one viewer is viewing the content, the viewer determining unit 112 determines a relationship between viewers, that is, the viewer category. Here, the viewer category indicates a social relationship between the viewers and an intimacy degree between the viewers. The social relationship is, for example, parent and child, brother and sister, couple, and friend. The intimacy degree is a normalized parameter obtained by adding (for example, calculating a weighted sum of) a physical distance and a psychological distance between viewers.

More specifically, when determining the social relationship, the viewer determining unit 112 determines a relationship attribute of each viewer, by pattern matching between the image of the face area of the viewer and each face image pre-registered in the memory, for each face area included in the captured image (frame). For example, the relationship attribute indicates one of attributes of a viewer, using a face image of the viewer and face images of other persons that have been pre-registered. The attributes include parent, child, brother and sister, husband, wife, and friend. When determining that a similarity between the image of the face area and the pre-registered face image is equal to or higher than the threshold, the viewer determining unit 112 determines the viewer attribute of the viewer by reading the viewer attribute associated with the pre-registered face image from the memory. As such, the viewer determining unit 112 determines the relationship attribute of the viewer corresponding to the face area, for each face area included in the captured image (frame). As a result, when the relationship attribute of one viewer is "child" and the relationship attribute of the other viewer is "parent", the viewer determining unit 112 determines that the viewer category of the viewers as "parent/child".

Furthermore, the viewer determining unit 112 first specifies a physical distance and a psychological distance between viewers when determining the intimacy degree. The physical distance is actually a distance between the viewers. The viewer determining unit 112 specifies the physical distance by measuring a distance between face areas included in the captured images (frames). Furthermore, the viewer determining unit 112 counts the number of occurrences that the viewers see each other face-to-face (face-to-face frequency) based on the captured images, and specifies the face-to-face frequency as the psychological distance. The viewer determining unit 112 may count the number of occurrences that the viewers gaze at each other (gaze frequency) based on the captured images, and specify the gaze frequency as the psychological distance. Furthermore, the viewer determining unit 112 may count the number of occurrences that the viewers smile (smile frequency) based on the captured images, and specify the smile frequency as the psychological distance. Furthermore, the viewer determining unit 112 may measure the time period for which the viewers is smiling (smile period) based on the captured images, and specify the smile period as the psychological distance. Furthermore, the viewer determining unit 112 may calculate a weighted sum of a face-to-face frequency, a gaze frequency, a smile frequency, and a smile period, and specify a result of the weighted sum as the psychological distance.

The face-to-face frequencies can be counted using the technique on, for example, detecting a direction of a human face disclosed in Patent Reference 6 ("METHOD AND APPARATUS FOR DETECTING DIRECTION OF FACE", Japanese Patent 3454726). Furthermore, the gaze frequencies can be counted using the technique on, for example, detecting a gaze direction disclosed in Non-patent Reference 1 ("Non-contact and Non-constraint Gaze Estimation for Interactive Information Display", Junji SATAKE, Akihiko KOBAYASH, Hiroaki KAWASHIMA, Takatsugu HIRAYAMA, Mitsuru MINAKUCHI, Hideki KOZIMA, Takashi MATSUYAMA, IPSJ SIG Technical Reports, 2007-HCI-125, Vol. 2007, No. 99, pp. 9-16, 2007). The smile frequencies may be counted and the smile periods may be measured, using the technique on recognizing the smile (for example, pattern matching based on the shapes of the human mouths).

The viewer determining unit 112 calculates the intimacy degree indicated by one of values 0 to 100 inclusive, for example, by calculating a weighted sum of the physical distance and the psychological distance that are specified as above and normalizing a result of the calculation. The larger the value of the intimacy degree is, the more intimate relationship the viewers have.

Accordingly, the viewing status information generating unit 113 generates the viewing status information including (i) the viewer information indicating one of the viewer attribute and the viewer category determined as described above and (ii) the content identification information for identifying the content displayed on the content display apparatus 21.

FIGS. 6A and 6B illustrate examples of the viewing status information.

As illustrated in FIG. 6A, the first viewing status information includes the content identification information and the viewer information indicating a viewer category. The viewer category indicates, for example, the social relationship "parent/child" and the intimacy degree "85". The content identification information indicates, for example, a title of a content "XYX". As illustrated in FIG. 6B, the second viewing status information includes the content identification information and the viewer information indicating a viewer attribute. The viewer attribute indicates, for example, the gender "male" and the age "40".

Next, generation of the viewing statistics information will be described.

The viewing statistics information generating unit 122 of the viewing statistics-gathering apparatus 120 reads the viewing status information transmitted from each of the viewing terminal apparatuses 110 and stored in the viewing status information storage unit 121. Then, the viewing statistics information generating unit 122 generates the viewing statistics information indicating the contents (content identification information) ranked for each viewer category or viewer attribute.

The viewing statistics information includes (i) the viewer attribute statistics information indicating contents ranked for each viewer attribute (content identification information) and (ii) the viewer category statistics information indicating contents ranked for each viewer category (content identification information).

FIGS. 7A and 7B illustrate examples of the viewing statistics information.

As illustrated in FIG. 7A, the viewer category statistics information included in the viewing statistics information indicates the ranked contents for each of the viewer categories (social relationship and intimacy degree). The intimacy degrees are, for example, divided into 10 steps. In the viewer category statistics information, the contents applicable to the social relationship "friend" and the intimacy degrees "0 to 10" are indicated by content identifiers "A01, A02, A03 . . . " in order from a higher-ranked content. In other words, the viewer category statistics information indicates that the content with the content identifier "A01" is the most frequently-viewed content, and the content with the content identifier "A02" is the second most frequently-viewed content, among the viewers who belong to the social relationship "friend" and the intimacy degrees "0 to 10".

As illustrated in FIG. 7B, the viewer attribute statistics information included in the viewing statistics information indicates the ranked contents for each of the viewer attributes (gender and age). Here, the ages are, for example, divided per 10 years (generation). In the viewer attribute statistics information, the contents applicable to the gender "male" and the ages "0 to 9" are indicated by identifiers "XA01, XA02, XA03 . . . " in order from a higher-ranked content. In other words, the viewer attribute statistics information indicates that the content with the content identifier "XA01" is the most frequently-viewed content, and the content with the content identifier "XA02" is the second most frequently-viewed content, among the viewers who belong to the gender "male" and the ages "0 to 9".

Next, presentation of the viewing statistics information will be described.

Upon receipt of a statistics display operation from a viewer, the display control unit 115 of the viewing terminal apparatus 110 reads the viewing statistics information stored in the viewing statistics information storage unit 114, and causes the content display apparatus 21 to display details of the viewing statistics information. For example, the viewer presses a predetermined button in a remote controller. The display control unit 115 receives a wireless signal transmitted from the remote controller, and displays the details of the viewing statistics information according to the wireless signal.

FIGS. 8A to 8D illustrate display modes of the viewing statistics information displayed by the content display apparatus 21.

The display control unit 115 determines a display mode according to an operation (view mode specifying operation) by the user, and causes the content display apparatus 21 to display the details of the viewing statistics information as a statistics image as illustrated in FIGS. 8A to 8D.

Figure 8A:
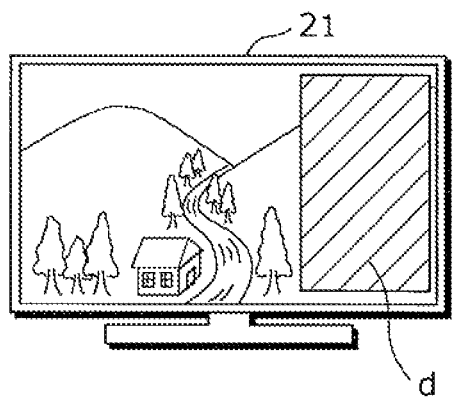
FIG. 8A illustrates a display mode of viewing statistics information displayed by a content display apparatus according to an embodiment of the present invention.
Figure 8B:
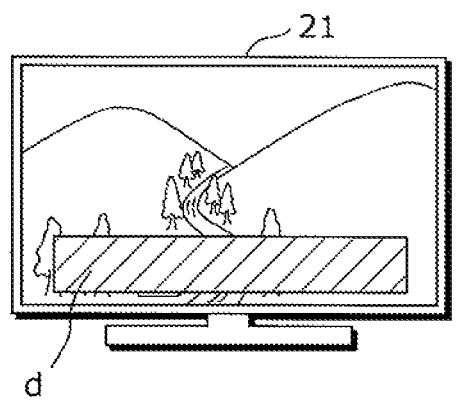
FIG. 8B illustrates another display mode of viewing statistics information displayed by the content display apparatus.

For example, as illustrated in FIG. 8A, the display control unit 115 causes the content display apparatus 21 to display a statistics image d to the right of the display. Here, the display control unit 115 causes the content display apparatus 21 to display the statistics image d to be superimposed on the image of the content displayed in a full screen mode. Furthermore, as illustrated in FIG. 8B, the display control unit 115 causes the content display apparatus 21 to display the statistics image d below the display. Here, the display control unit 115 causes the content display apparatus 21 to display the statistics image d to be superimposed on the image of the content displayed in a full screen mode, as in the same manner as FIG. 8A.

Figure 8C:
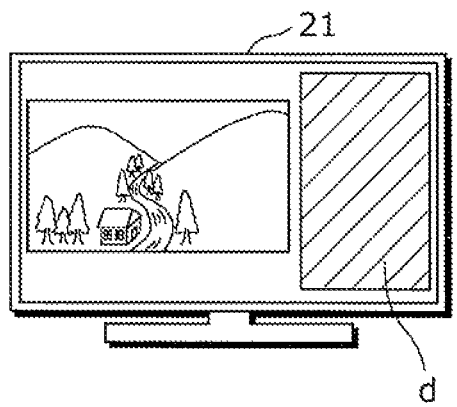
FIG. 8C illustrates another display mode of viewing statistics information displayed by the content display apparatus.
Figure 8D:
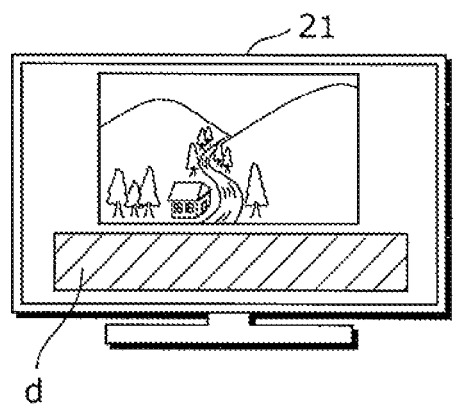
FIG. 8D illustrates another display mode of viewing statistics information displayed by the content display apparatus.

Furthermore, the display control unit 115 causes the content display apparatus 21 to display the statistics image d not to be superimposed on the image of the content, in response to a view mode specifying operation by the viewer. In this case, as illustrated in FIG. 8C, the display control unit 115 causes the content display apparatus 21 to display a reduced image of the content and the statistics image d to the right of the reduced image. Furthermore, as illustrated in FIG. 8D, the display control unit 115 causes the content display apparatus 21 to display a reduced image of the content and the statistics image d under the reduced image.

Figure 9A:
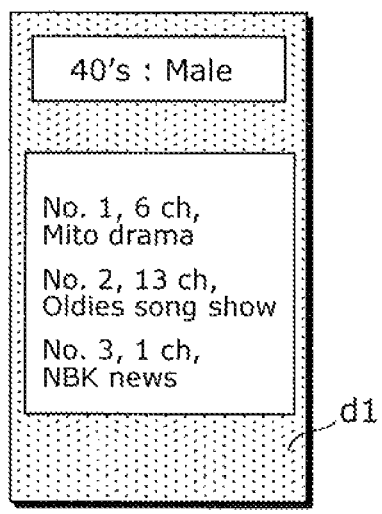
FIG. 9A illustrates an example of a statistics image when one viewer is viewing a content according to an embodiment of the present invention.
Figure 9B:
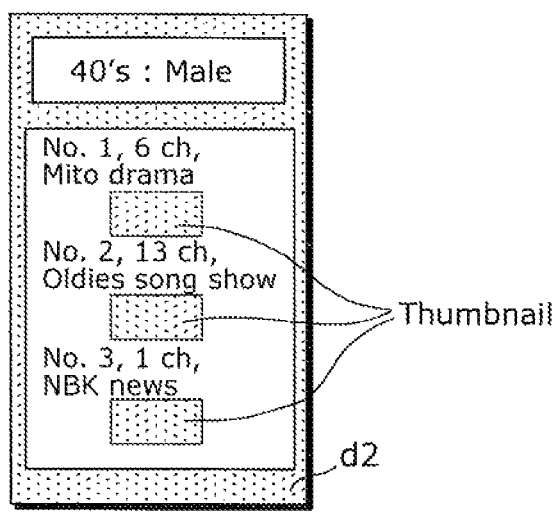
FIG. 9B illustrates another example of a statistics image when one viewer is viewing a content.

FIGS. 9A and 9B illustrate examples of statistics images when one viewer is viewing a content.

The display control unit 115 determines a style of the statistics image, according to an operation by the viewer (style specifying operation), the number of viewers, the viewer attribute, and the viewer category that are determined by the viewer determining unit 112. Then, the display control unit 115 causes the content display apparatus 21 to display the details of the viewing statistics information as a statistics image, according to the determined style.

When the viewer determining unit 112 determines that one viewer is viewing the content, the display control unit 115 causes the content display apparatus 21 to display a statistics image d1 indicating a viewer attribute and a list of the content identification information of contents ranked according to the viewer attribute (viewing content ranking) as illustrated in FIG. 9A, based on the viewer attribute statistics information included in the viewing statistics information. In other words, the display control unit 115 searches the viewer attribute statistics information for the content identification information of the contents ranked according to the viewer attribute determined by the viewer determining unit 112. Then, the display control unit 115 generates the statistics image d1 using the viewer attribute and the obtained content identification information of the contents, and causes the content display apparatus 21 to display the statistics image d1.

The statistics image d1 indicates an age and a gender as the viewer attributes, and channels and titles of the contents as the content identification information. For example, the statistics image d1 indicates the generation "40's" and the gender "male", and ranking of the top-3 contents and the content identification information of "No. 1, 6 ch, Mito drama", "No. 2, 13 ch, Oldies song show", and "No. 3, 1 ch, NBK news". In other words, the statistics image d1 indicates the viewing content ranking of males in their 40s, and more specifically, that the content the most frequently viewed by the males in their 40s is "6 ch, Mito drama", the second most frequently viewed content is "13 ch, Oldies song show", and the third most frequently viewed content is "1 ch, NBK news".

Here, upon receipt of the style specifying operation from the viewer, the display control unit 115 changes the style of a statistics image as illustrated in FIG. 9B. In other words, the display control unit 115 causes the content display apparatus 21 to display a statistics image d2 indicating the channels, titles, and thumbnails (reduced still images or reduced moving images) of the contents as content identification information.

Figure 10:
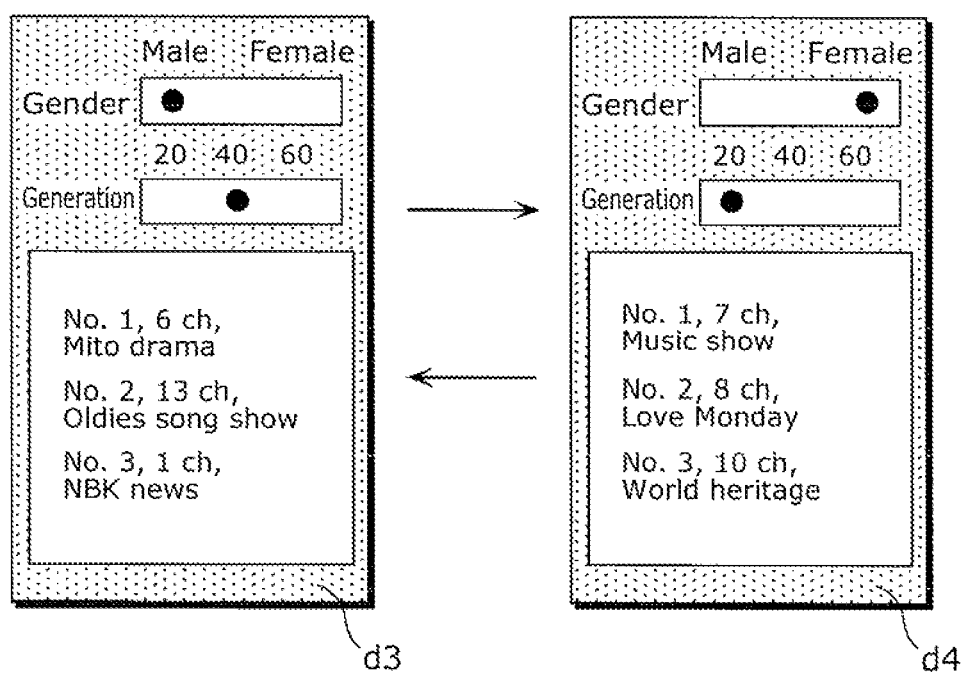
FIG. 10 illustrates another example of statistics images when one viewer is viewing a content.

FIG. 10 illustrates another example of a statistics image when one viewer is viewing a content.

Upon receipt of a style specifying operation from the viewer, the display control unit 115 changes the style of a statistics image to a style in which the viewer attribute can be specified, as illustrated in FIG. 10. In other words, the display control unit 115 causes the content display apparatus 21 to display a statistics image d3. In the statistics image d3, the gender and generation of the viewer attribute are indicated by positions of pointers. As illustrated in the statistics image d1 of FIG. 9A, the statistics image d3 indicates the generation "40" and the gender "male" that are viewer attributes, and the viewing content ranking according to the viewer attributes, that is, ranking of the top-3 contents and the content identification information of "No. 1, 6 ch, Mito drama", "No. 2, 13 ch, Oldies song show", and "No. 3, 1 ch, NBK news".

Here, upon specification of viewer attributes by an operation of a viewer (attribute specification operation), the display control unit 115 causes the content display apparatus 21 to change the statistics image from the statistics image d3 to the statistics image d4 according to the specified viewer attributes. For example, the viewer specifies viewer attributes by operating an button of a remote controller and through voice input. As a result, the display control unit 115 accepts, for example, the generation "20" and the gender "female" as the specified viewer attributes, and causes the content display apparatus 21 to change the positions of the pointers to corresponding positions of the age and the gender. Furthermore, the display control unit 115 searches the viewer attribute statistics information for the content identification information of the contents ranked according to the specified viewer attributes, and generates a statistics image d4 using the obtained content identification information of the contents. The statistics image d4 indicates the generation "20" and the gender "female" that are viewer attributes, and the viewing content ranking according to the viewer attributes, that is, ranking of the top-3 contents among the contents searched for the viewer attributes and the content identification information of "No. 1, 7 ch, Music show", "No. 2, 8 ch, Love Monday", and "No. 3, 10 ch, World heritage".

Thereby, the viewer can obtain not only the viewer attributes but also the viewing content ranking of any viewer attributes. Thus, the viewer can know a viewing status of a viewer attribute that interests the viewer, such as a content persons of the opposite sex in the same generation are viewing and a content persons of the different generation are viewing.

Figure 11A:
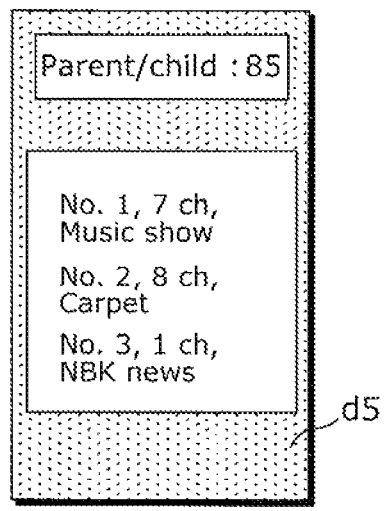
FIG. 11A illustrates an example of a-statistics image when more than one viewer is viewing a content.
Figure 11B:
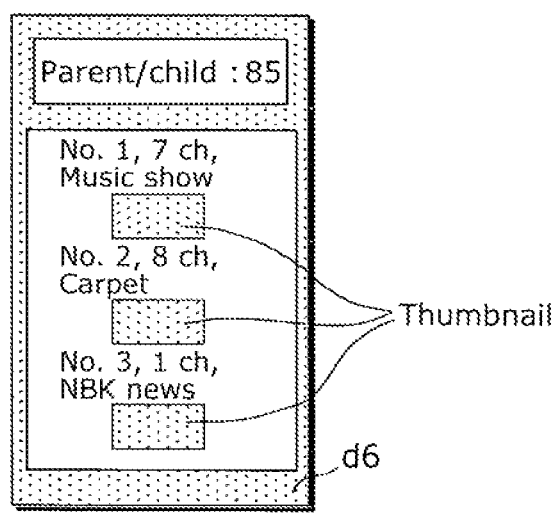
FIG. 11B illustrates another example of a statistics image when more than one viewer is viewing a content.

FIGS. 11A and 11B illustrate examples of statistics images when more than one viewer is viewing a content.

When the viewer determining unit 112 determines that more than one viewer is viewing a content, the display control unit 115 causes the content display apparatus 21 to display a statistics image d5 indicating viewer categories and a list of the content identification information (viewing content ranking) of the contents ranked according to the viewer categories based on the viewer category statistics information included in the viewing statistics information as illustrated in FIG. 11A. In other words, the display control unit 115 searches the viewer category statistics information for the content identification information of the contents ranked according to the viewer categories determined by the viewer determining unit 112. Then, the display control unit 115 generates the statistics image d5 using the viewer attributes and the obtained content identification information of the contents, and causes the content display apparatus 21 to display the statistics image d5.

The statistics image d5 indicates a social relationship and an intimacy degree as the viewer categories, and channels and titles of the contents as the content identification information. For example, the statistics image d5 indicates the social relationship "parent/child" and the intimacy degree "85", and ranking of the top-3 contents and the content identification information of "No. 1, 7 ch, Music show", "No. 2, 8 ch, Carpet", and "No. 3, 1 ch, NBK news". In other words, the statistics image d5 indicates the viewing content ranking for the parent and child having the intimacy degree "85", and more specifically that the content the most frequently viewed by the parent and child having the intimacy degree "85" is "7 ch, Music show", the second most frequently viewed content is "8 ch, Carpet", and the third most frequently viewed content is "1 ch, NBK news".

Here, upon receipt of the style specifying operation from the viewer, the display control unit 115 changes the style of a statistics image as illustrated in FIG. 11B. In other words, the display control unit 115 causes the content display apparatus 21 to display a statistics image d6 indicating the channels, titles, and thumbnails (reduced still images or reduced moving images) of the contents as content identification information.

Figure 12:
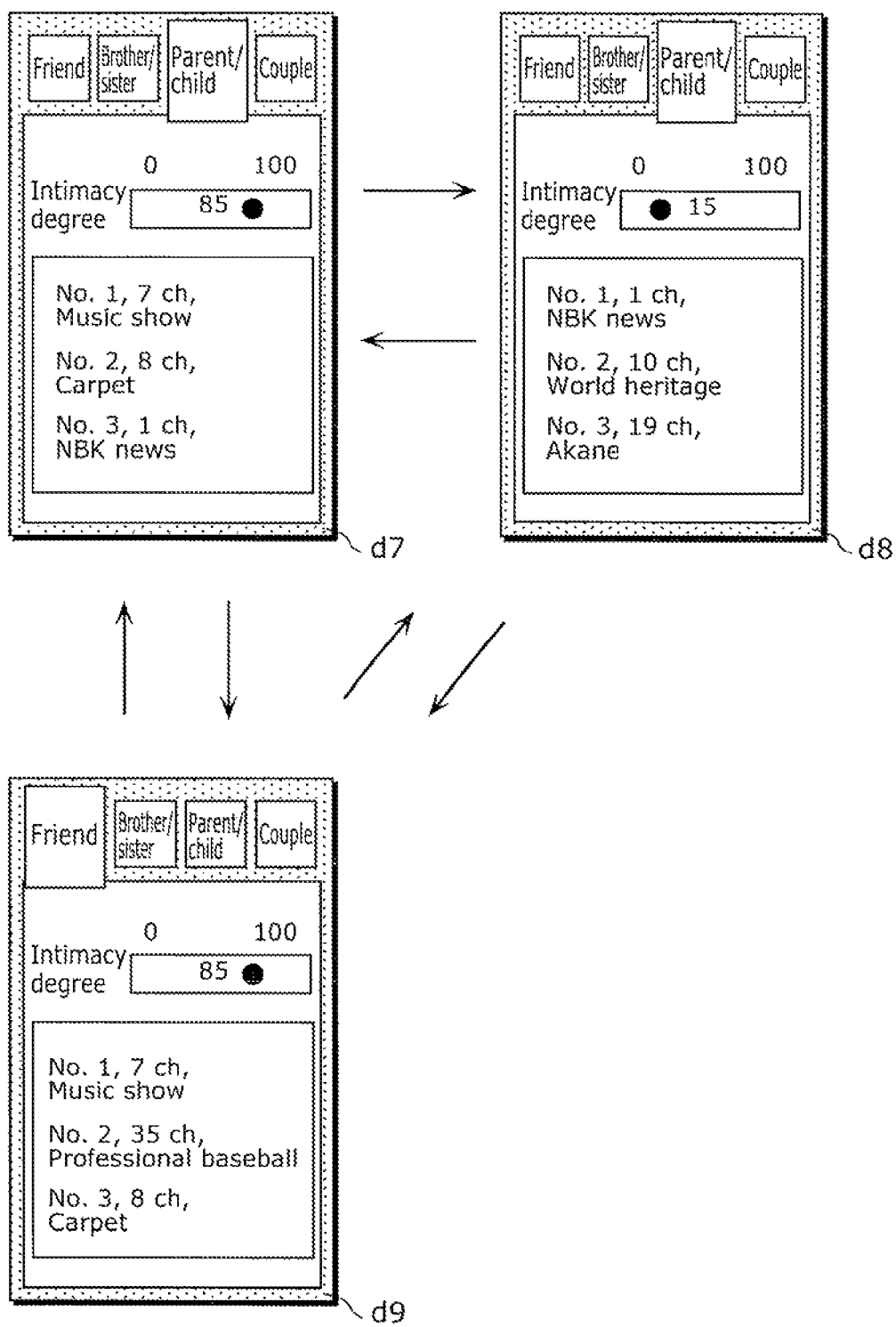
FIG. 12 illustrates another example of statistics images when more than one viewer is viewing a content.

FIG. 12 illustrates another example of a statistics image when more than one viewer is viewing a content.

Upon receipt of another style specifying operation from the viewer, the display control unit 115 changes the style of a statistics image to a style in which the viewer category can be specified, as illustrated in FIG. 12. In other words, the display control unit 115 causes the content display apparatus 21 to display a statistics image d7. In the statistics image d7, each social relationship between the viewer categories determined by the viewer determining unit 112 is represented by the size of a tab, and the intimacy degree of the viewer categories determined by the viewer determining unit 112 is indicated by a position of a pointer. The social relationship displayed in a tab larger than other tabs is indicated as the social relationship determined by the viewer determining unit 112. Furthermore, as illustrated in the statistics image d5 of FIG. 11A, the statistics image d7 indicates the social relationship "parent/child" and the intimacy degree "85" that are viewer categories, and the viewing content ranking according to the'viewer categories, that is, ranking of the top-3 contents and the content identification information of "No. 1, 7 ch, Music show", "No. 2, 8 ch, Carpet", and "No. 3, 1 ch, NBK news".

Here, upon specification of a viewer category by an operation of a viewer (category specification operation), the display control unit 115 causes the content display apparatus 21 to change the statistics image from the statistics image d7 to statistics image d8 or d9 according to the specified viewer category. For example, the viewer specifies a viewer category by operating an button of a remote controller and through voice input. As a result, the display control unit 115 accepts, for example, the social relationship "parent/child" and the intimacy degree "15" as the specified viewer categories, and causes the content display apparatus 21 to change a position of a pointer to a position corresponding to the intimacy degree. Furthermore, the display control unit 115 searches the viewer category statistics information for the content identification information of the contents ranked according to the specified viewer categories, and generates the statistics image d8 using the obtained content identification information of the contents. The statistics image d8 indicates the social relationship "parent/child" and the intimacy degree "15" as the viewer categories, and the viewing content ranking according to the viewer categories, that is, ranking of the top-3 contents and the content identification information of "No. 1, 1 ch, NBK news", "No. 2, 10 ch, World heritage", and "No. 3, 19 ch, Akane".

Furthermore, the display control unit 115 displays a tab in which the social relationship is indicated, larger than other tabs when the social relationship "friend" and the intimacy degree "85" are received as the specified viewer categories. Furthermore, the display control unit 115 searches the viewer category statistics information for the content identification information of the contents ranked according to the specified viewer categories, and generates the statistics image d9 using the obtained content identification information of the contents. The statistics image d9 indicates the social relationship "friend" and the intimacy degree "85" that are the viewer categories, and the viewing content ranking according to the viewer categories, that is, ranking of the top-3 contents and the content identification information of "No. 1, 7 ch, Music show", "No. 2, ch, Professional baseball", and "No. 3, 8 ch, Carpet".

Thereby, the viewers who are viewing the content displayed on the content display apparatus 21 can know not only the viewer categories of the viewers but also the viewing content ranking of any viewer categories.

Figure 13:
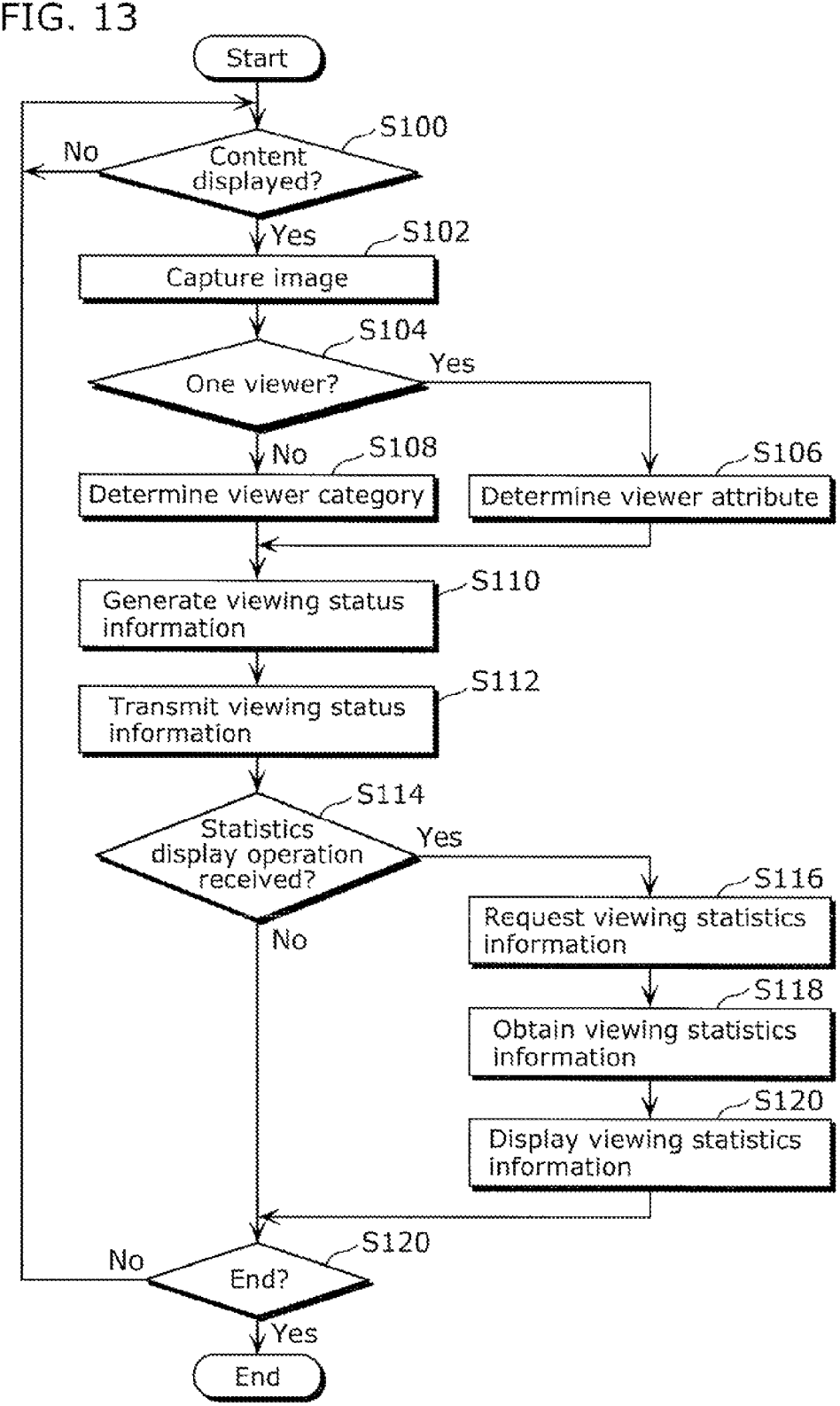
FIG. 13 is a flowchart of operations performed by the viewing terminal apparatus.

FIG. 13 is a flowchart of operations performed by the viewing terminal apparatus 110.

First, the sensing unit 111 of the viewing terminal apparatus 110 determines whether or not a content is displayed on the content display apparatus 21 (Step S100). Here, when determining that the content is displayed (Yes at Step S100), the sensing unit 111 captures and generates an image (Step S102). The viewer determining unit 112 determines whether or not one viewer is viewing the content displayed on the content display apparatus 21 based on the captured image generated at Step S102 (Step S104).

Here, when determining that one viewer is viewing the content (Yes at Step S104), the viewer determining unit 112 determines a viewer attribute of the viewer (Step S106). When determining that more than one viewer is viewing the content (No at Step S104), the viewer determining unit 112 determines a viewer category of the viewers (Step S108). Then, the viewer determining unit 112 generates viewing status information (first or second viewing status information) indicating one of the viewer attribute determined at Step S106 and the viewer category determined at Step S108 (Step S110). The terminal communicating unit 116 transmits, to the viewing statistics-gathering apparatus 120, the viewing status information generated at Step S110 (Step S112).

Next, the display control unit 115 determines whether or not to receive a statistics display operation from one or more than one viewer (Step S114). For example, the display control unit 115 determines whether or not to receive the statistics display operation, based on whether or not a predetermined button of a remote controller is pressed and a wireless signal is received from the remote controller.

Here, when determining to receive the statistics display operation from one or more than one viewer (Yes at Step S114), the display control unit 115 instructs the terminal communicating unit 116 to transmit a request message. As a result, the terminal communicating unit 116 requests the viewing statistics-gathering apparatus 120 to issue the viewing statistics information by transmitting the request message to the viewing statistics-gathering apparatus 120 (Step S116). Upon receipt of the request message, the viewing statistics-gathering apparatus 120 transmits the latest viewing statistics information to the viewing terminal apparatus 110. The display control unit 115 of the viewing terminal apparatus 110 obtains the viewing statistics information through the terminal communicating unit 116 (Step S118), and causes the content display apparatus 21 to display the details of the viewing statistics information (Step S120).

Upon determination that the statistics display operation from one or more than one viewer is not received at Step S114 (No at Step S114) or when the details of the viewing statistics information are displayed at Step S120, the sensing unit 111 determines whether or not the operations should end based on a termination operation by the user (Step S122). When the sensing unit 111 determines that operations should not end (No at Step S122), the viewing terminal apparatus 110 executes the processing from Step S100. When the sensing unit 111 determines that operations should end (Yes at Step S122), the viewing terminal apparatus 110 ends the processing.

Figure 14:
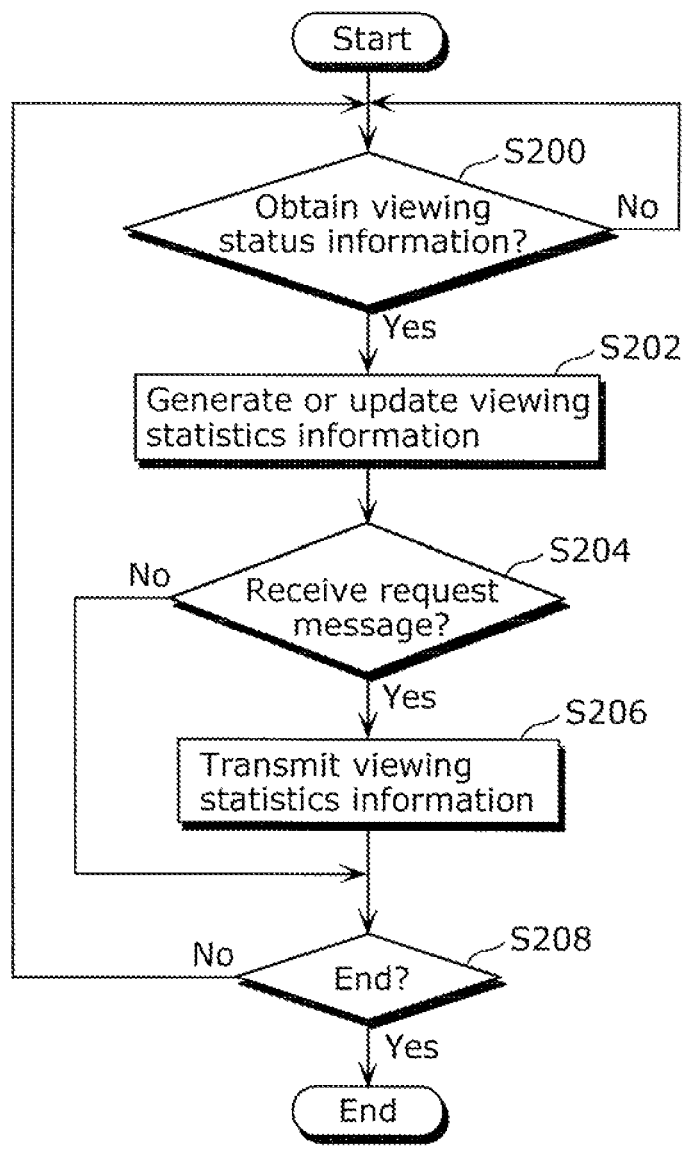
FIG. 14 is a flowchart of operations performed by the viewing statistics-gathering apparatus.

FIG. 14 is a flowchart of operations performed by the viewing statistics-gathering apparatus 120.

First, when the statistics communicating unit 124 receives the viewing status information transmitted from the viewing terminal apparatus 110, the viewing statistics information generating unit 122 of the viewing statistics-gathering apparatus 120 determines whether or not the viewing status information is stored in the viewing status information storage unit 121 (Step S200). In other words, the viewing statistics information generating unit 122 determines whether or not the viewing statistics-gathering apparatus 120 obtains new viewing status information. Here, when determining that the viewing statistics-gathering apparatus 120 obtains the new viewing status information (Yes at Step S200), the viewing statistics information generating unit 122 generates or updates the viewing statistics information based on the newly obtained viewing status information (Step S202).

Next, the viewing statistics information providing unit 123 of the viewing statistics-gathering apparatus 120 determines whether or not the statistics communicating unit 124 of the viewing statistics-gathering apparatus 120 receives the request message transmitted from the viewing terminal apparatus 110 (Step S204). Here, when determining that the statistics communicating unit 124 receives the request message (Yes at Step S204), the viewing statistics information providing unit 123 instructs the statistics communicating unit 124 to transmit the latest viewing statistics information generated or updated by the viewing statistics information generating unit 122. As a result, the statistics communicating unit 124 transmits the latest viewing statistics information to the viewing terminal apparatus 110 that has issued the request message (Step S206).

When the viewing statistics information providing unit 123 determines that the statistics communicating unit 124 does not receive the request message (No at Step S204), or when the statistics communicating unit 124 transmits the latest viewing statistics information at Step S206, the viewing statistics-gathering apparatus 120 determines whether or not the operations should end based on a termination operation by the user (Step S208). When determining that operations should not end (No at Step S208), the viewing terminal apparatus 120 executes the processing from Step S200. When determining that operations should end (Yes at Step S208), the viewing terminal apparatus 120 ends the processing.

As such, in the viewing statistics-processing system 100 in the embodiment, the viewing terminal apparatus 110 transmits the first viewing status information indicating the content being viewed and the viewer category that are associated with each other, to the viewing statistics-gathering apparatus 120. Thus, with receipt of the first viewing status information from each of the viewing terminal apparatuses 110, the viewing statistics-gathering apparatus 120 can gather not statistics of the mass (general public) but statistics on viewing of a content for each viewer category. For example, the viewing statistics-gathering apparatus 120 can gather statistics for each viewer category, such as newly-married couple, older-couple, parent and child, and friend, based on the first viewing status information transmitted from each of the viewing terminal apparatuses 110. Furthermore, a result of the statistics is presented by the viewing terminal apparatus 110 (and the content display apparatus 21) as a result of the statistics on viewing of a content only by viewers belonging to a predetermined viewer category. Thus, the viewers who are viewing the content can know not a rough statistics result of the mass (general public) but a detailed statistics result of viewers having a predetermined relationship (for example, newly-married couple, older-couple, parent and child, or friend) among the mass (general public). Thus, the viewing statistics-processing system 100 in the embodiment can present an appropriate result of statistics on viewing of a content for the diversified viewing modes. In other words, compared to the conventional audience rating, information that can be a detailed reference can be provided to the viewers.

(Modification 1)

Next, Modification 1 of the embodiment will be described. A viewing statistics-processing system according to Modification 1 is characterized by subjectively displaying ranks of contents on the content display apparatus 21 when details of viewing statistics information are displayed thereon.

Figure 15A:
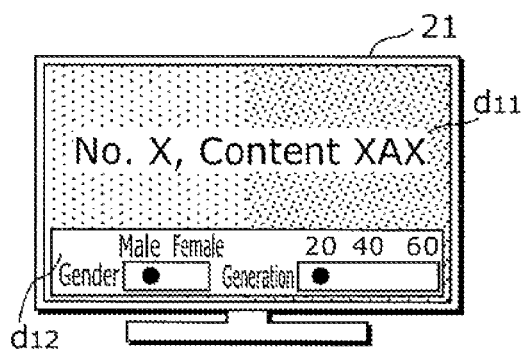
FIG. 15A illustrates a display example of viewing statistics information according to Modification 1 in the embodiment of the present invention.

FIG. 15A illustrates a display example of the viewing statistics information according to Modification 1.

When one viewer is viewing a content, upon receipt of a statistics display operation from the viewer, the display control unit 115 causes the content display apparatus 21 to display a rank of the content, the content identification information "No. X, Content XAX", and an attribute image d12 indicating the viewer attribute to be superimposed on the content image d11 as illustrated in FIG. 15A. Here, the attribute image d12 is, for example, superimposed below the image d11, and the rank of the content is superimposed at the upper left of the image d11, for example.

Figure 15B:
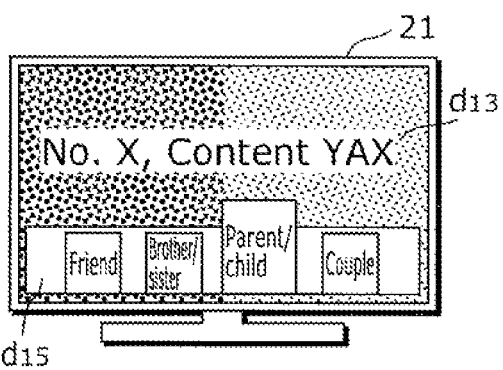
FIG. 15B illustrates another display example of viewing statistics information according to Modification 1.

FIG. 15B illustrates another display example of the viewing statistics information according to Modification 1.

When more than one viewer is viewing a content, upon receipt of a statistics display operation from the viewers, the display control unit 115 causes the content display apparatus 21 to display a rank of the content displayed on the content display apparatus 21, the content identification information "No. X, Content YAX", and a category image d15 indicating only the social relationship between the viewer categories to be superimposed on the content image d13 as illustrated in FIG. 15B. Here, the category image d15 is, for example, superimposed below the image d13, and the rank of the content is superimposed at the upper left of the image d13, for example.

Figure 15C:
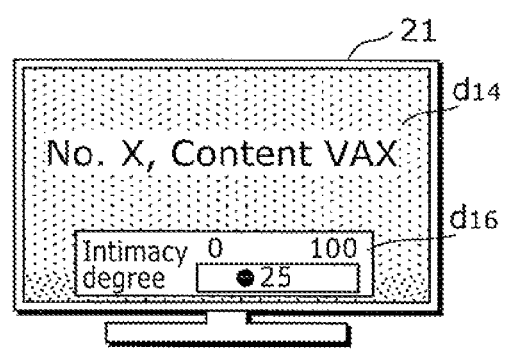
FIG. 15C illustrates another display example of viewing statistics information according to Modification 1.

FIG. 15C illustrates another display example of the viewing statistics information according to Modification 1.

When more than one viewer is viewing a content, the display control unit 115 according to Modification 1 may cause a category image d16 to be superimposed on a content image d14 as illustrated in FIG. 15C. The category image d16 indicates only an intimacy degree instead of a social relationship that is a viewer category.

Figure 15D:
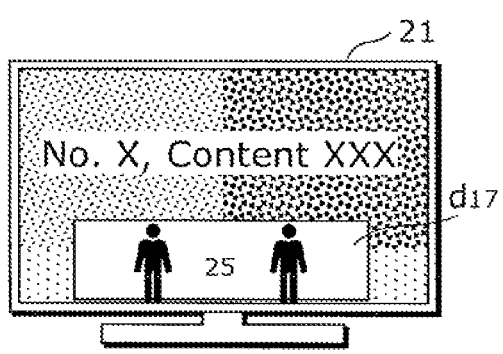
FIG. 15D illustrates another display example of viewing statistics information according to Modification 1.

FIG. 15D illustrates another display example of the viewing statistics information according to Modification 1.

When a category image indicating an intimacy degree that is a viewer category is displayed, the display control unit 115 according to Modification 1 may cause the content display apparatus 21 to display a category image d17 indicating an intimacy degree by a distance between two human figures (icons) as illustrated in FIG. 15D. Thereby, the visual recognition of the intimacy degree can be improved.

Figure 15E:
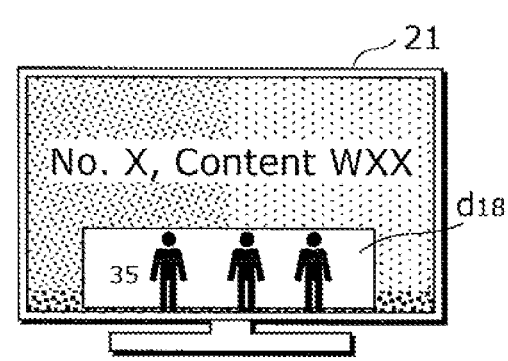
FIG. 15E illustrates another display example of viewing statistics information according to Modification 1.

FIG. 15E illustrates another display example of the viewing statistics information according to Modification 1.

When a category image indicating an intimacy degree that is a viewer category is displayed, the display control unit 115 according to Modification 1 may cause the content display apparatus 21 to display a category image d18 indicating an intimacy degree by a distance between human figures (icons) having the same number as that of the viewers who are viewing the content, as illustrated in FIG. 15E. Here, the viewer determining unit 112 determines the number of viewers. Thereby, the viewers can know the detailed intimacy degree.

Although a category image indicating only one of the social relationship and the intimacy degree is displayed on the content display apparatus 21 as illustrated in FIGS. 15B to 15E according to Modification 1, a category image indicating both the social relationship and the intimacy degree may be displayed thereon.

(Modification 2)

Here, Modification 2 of the embodiment will be described. A viewing statistics-processing system according to Modification 2 is characterized by subjectively displaying a top-ranked content on the content display apparatus 21 when details of viewing statistics information are displayed thereon. In other words, when a content displayed on the content display apparatus 21 is different from the top-ranked content, the content image displayed thereon may be switched to the top-ranked content.

Figure 16A:
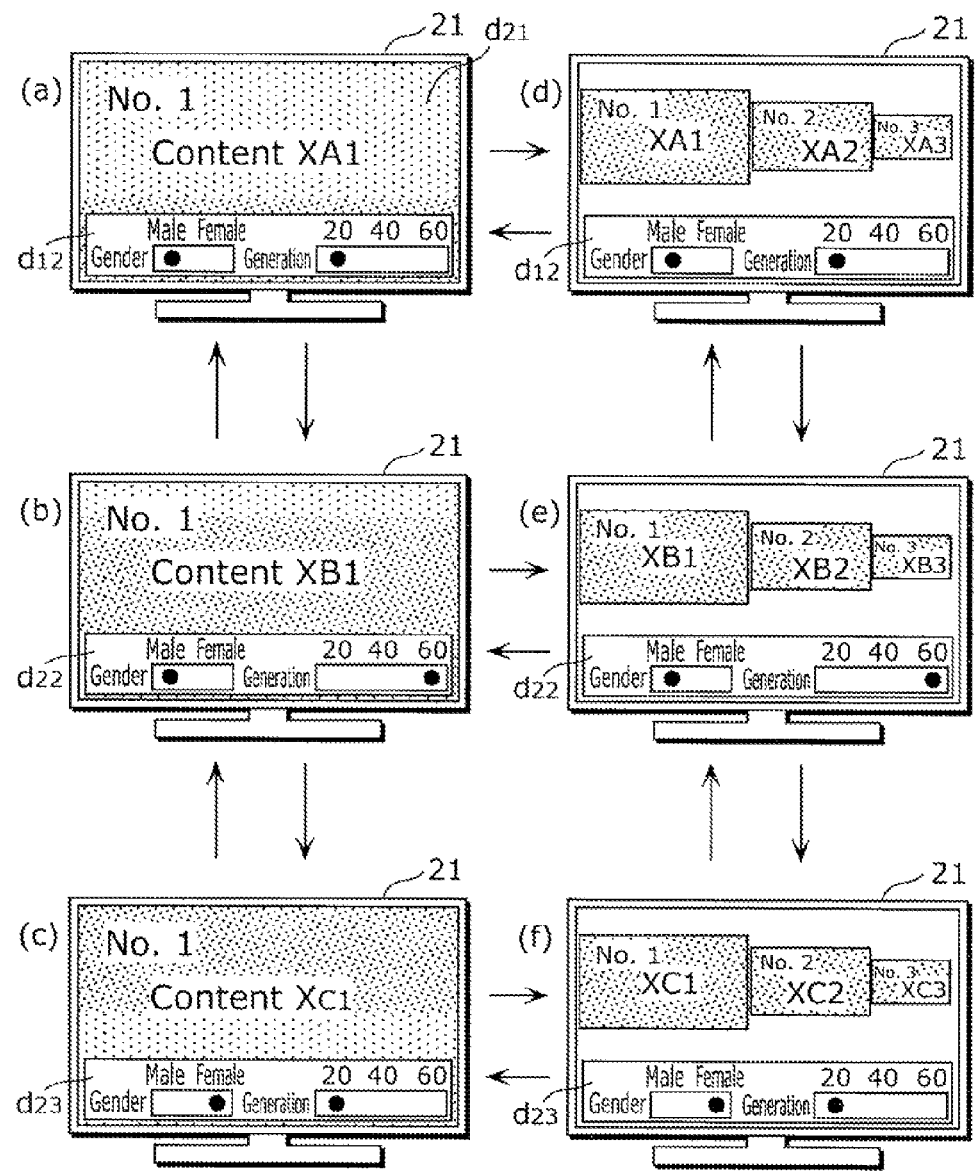
FIG. 16A illustrates transition of displayed states of the viewing statistics information according to Modification 2 in the embodiment of the present invention.

FIG. 16A illustrates transition of displayed states of the viewing statistics information according to Modification 2.

When one viewer is viewing a content, upon receipt of the statistics display operation by the viewer, the display control unit 115 according to Modification 2 causes the content display apparatus 21 to display the "No. 1", the content identification information of the top-ranked content "Content XA1", an attribute image d12 indicating the viewer attribute to be superimposed on a top-ranked content image d21 as illustrated in (a) of FIG. 16A. Here, the attribute image d12 is, for example, superimposed below the image d21, and "No. 1" is superimposed at the upper left of the image d21, for example.

Here, upon specification of viewer attributes (gender and generation) through an attribute specification operation by the user, the display control unit 115 causes the content display apparatus 21 to display an attribute image d22 or d23 according to the specified viewer attribute as illustrated in (b) or (c) of FIG. 16A. In other words, the display control unit 115 changes a position of a pointer in the attribute image to be displayed to a position according to the specified viewer attribute. Furthermore, the display control unit 115 changes the content identification information and the content image that are being displayed, to the content identification information corresponding to the top-ranked content and the top-ranked content image according to the specified viewer attribute.

Furthermore, upon specification of a rank (for example, third rank) through a rank specification operation by the user, the display control unit 115 causes the content display apparatus 21 to display images of contents ranked from top to the specified rank (for example, third rank), the ranks of these contents, and the content identification information as illustrated in (d), (e), and (f) of FIG. 16A.

The attribute specification operation and the rank specification operation are performed with a button of a remote controller pressed or voice input to a microphone by the viewer.

Figure 16B:
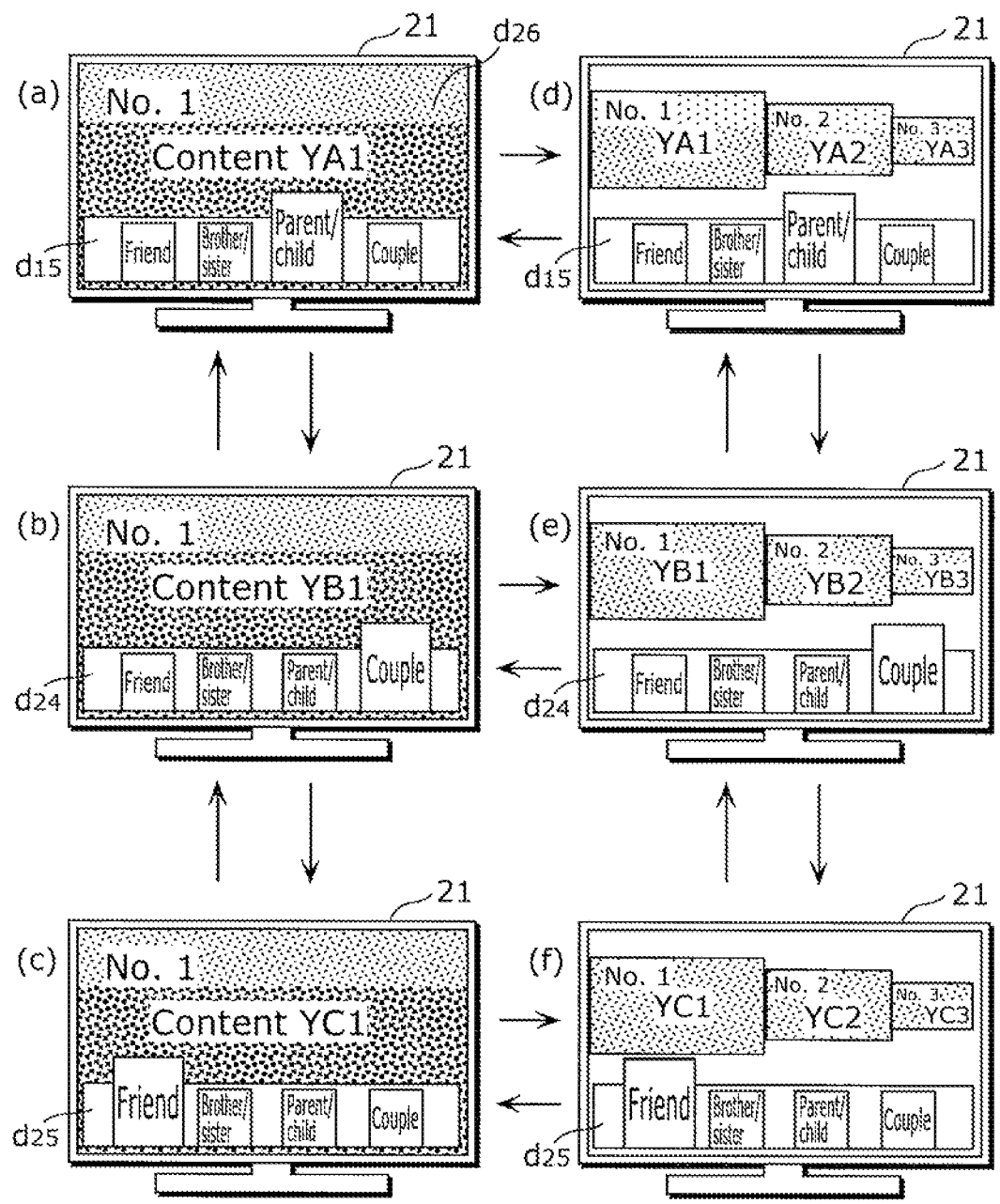
FIG. 16B illustrates transition of displayed states of the viewing statistics information according to Modification 2.

FIG. 16B illustrates another transition of displayed states of the viewing statistics information according to Modification 2.

When more than one viewer is viewing a content, upon receipt of the statistics display operation by the viewers, the display control unit 115 according to Modification 2 causes the content display apparatus 21 to display "No. 1", the content identification information of the top-ranked content "ContentYA1", and a category image d15 only indicating the social relationship that is a viewer category to be superimposed on a top-ranked content image d26 as illustrated in (a) of FIG. 16B. Here, the attribute image d15 is, for example, superimposed below the image d26, and "No. 1" is superimposed at the upper left of the image d26, for example.

Here, upon specification of a social relationship through an relationship specification operation by the user, the display control unit 115 causes the content display apparatus 21 to display a category image d24 or d25 according to the specified social relationship as illustrated in (b) or (c) of FIG. 16B. In other words, the display control unit 115 causes the content display apparatus 21 to display a tab indicating the specified social relationship larger than other tabs in a category image. Furthermore, the display control unit 115 changes the content identification information and the content image that are being displayed, to the content identification information corresponding to the top-ranked content and the top-ranked content image according to the specified social relationship.

Furthermore, upon specification of a rank (for example, third rank) through a rank specification operation by the user, the display control unit 115 causes the content display apparatus 21 to display images of contents ranked from top to the specified rank (for example, third rank), the ranks of these contents, and the content identification information as illustrated in (d), (e), and (f) of FIG. 16B.

The relationship specification operation and the rank specification operation are performed with a button of a remote controller pressed or voice input to a microphone by the viewer.

Figure 16C:
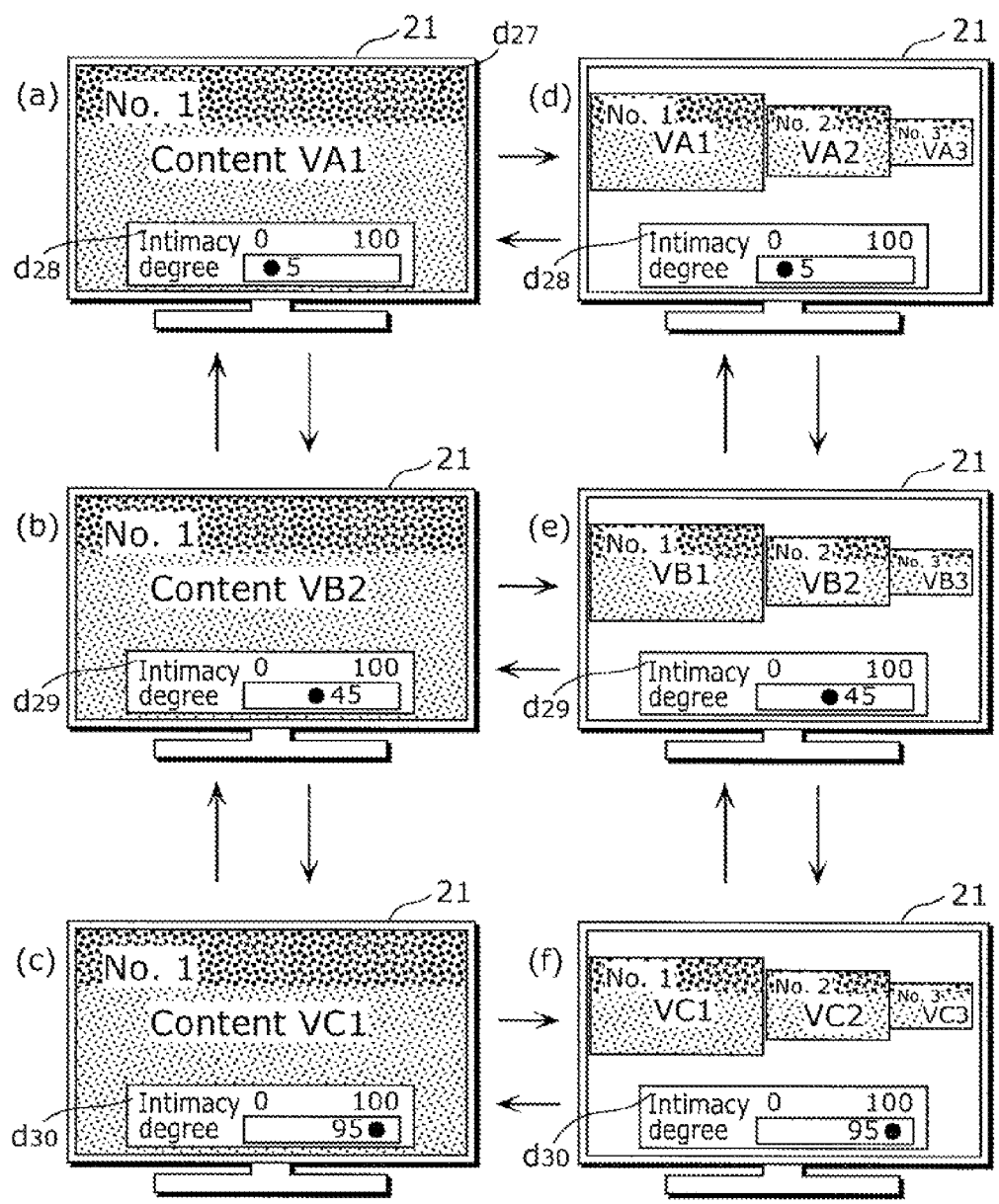
FIG. 16C illustrates another transition of displayed states of the viewing statistics information according to Modification 2.

FIG. 16C illustrates another transition of displayed states of the viewing statistics information according to Modification 2.

When more than one viewer is viewing a content, the display control unit 115 according to Modification 2 may cause the content display apparatus 21 to display a category image d28 to be superimposed on a content image d27 as illustrated in (a) of FIG. 16C. The category image d28 indicates only an intimacy degree instead of a social relationship between viewer categories.

Here, upon specification of an intimacy degree through an intimacy degree specification operation by the user, the display control unit 115 causes the content display apparatus 21 to display a category image d29 or d30 according to the specified intimacy degree as illustrated in (b) or (c) of FIG. 16C. In other words, the display control unit 115 changes a position of a pointer in the category image to be displayed to a position according to the specified intimacy degree. Furthermore, the display control unit 115 changes the content identification information and the content image that are being displayed, to the content identification information corresponding to the top-ranked content and the top-ranked content image according to the specified intimacy degree.

Furthermore, upon specification of a rank (for example, third rank) through a rank specification operation by the user, the display control unit 115 causes the content display apparatus 21 to display images of contents ranked from top to the specified rank (for example, third rank), the ranks of these contents, and the content identification information as illustrated in (d), (e), and (f) of FIG. 16C.

The intimacy degree specification operation and the rank specification operation are performed with a button of a remote controller pressed or voice input to a microphone by the viewer.

Figure 16D:
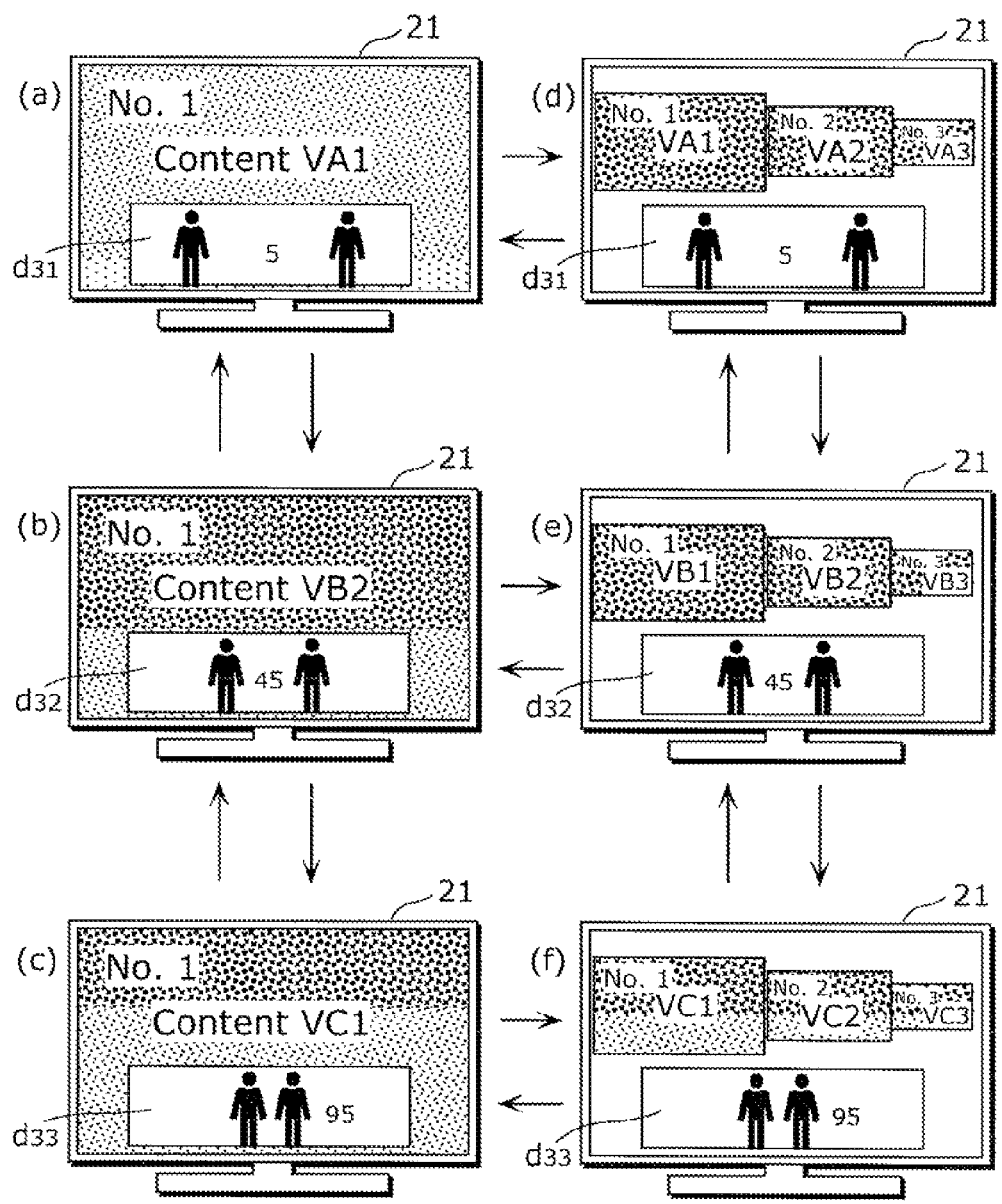
FIG. 16D illustrates another transition of displayed states of the viewing statistics information according to Modification 2.

FIG. 16D illustrates another transition of displayed states of the viewing statistics information according to Modification 2.

When a category image indicating an intimacy degree of a viewer category is displayed, the display control unit 115 according to Modification 2 may cause the content display apparatus 21 to display category images d31 to d33 each indicating an intimacy degree by a distance between two human figures (icons) as illustrated in (a) to (f) of FIG. 16D. Thereby, the visual recognition of the intimacy degree can be improved.

Figure 16E:
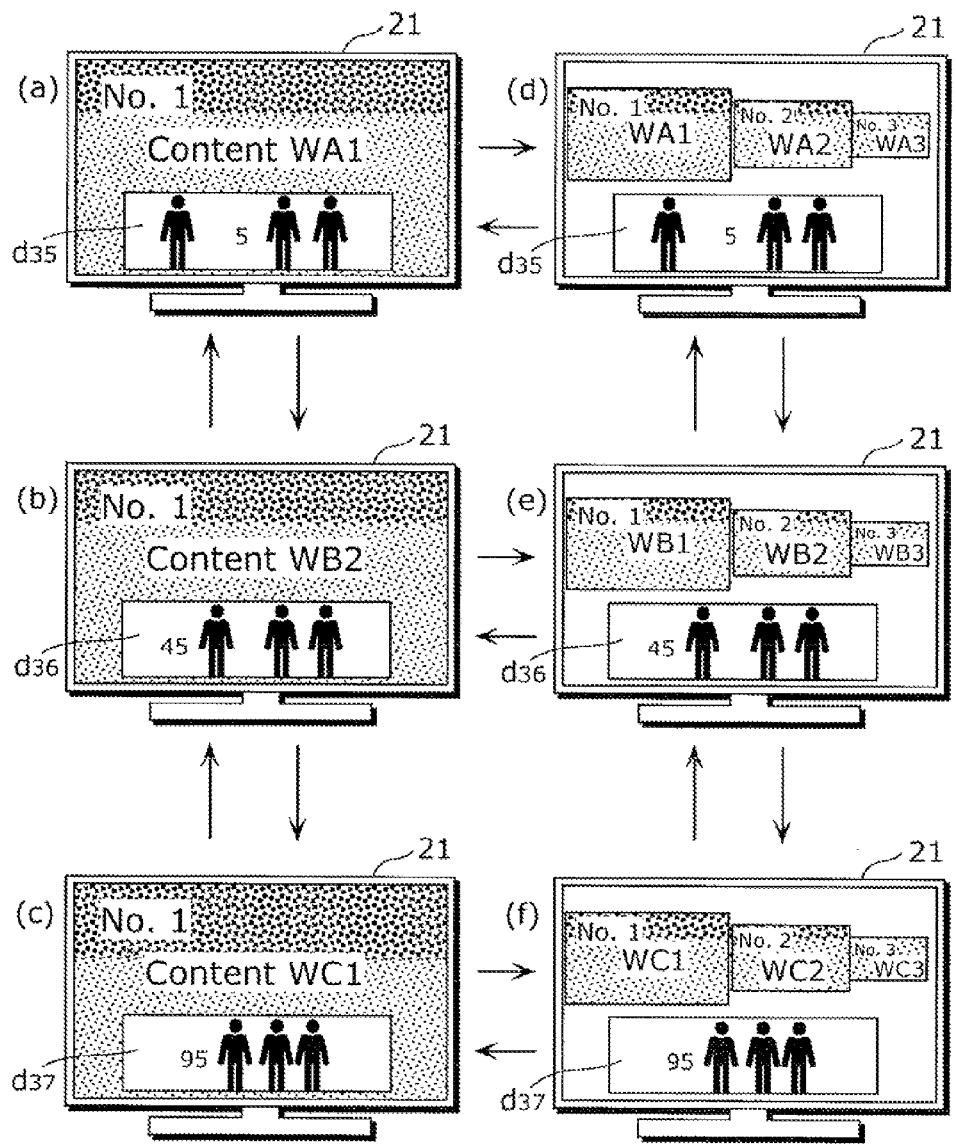
FIG. 16E illustrates another transition of displayed states of the viewing statistics information according to Modification 2.

FIG. 16E illustrates another transition of displayed states of the viewing statistics information according to Modification 2.

When a category image indicating an intimacy degree that is a viewer category is displayed, the display control unit 115 according to Modification 2 may cause the content display apparatus 21 to display category images d35 to d37 each indicating an intimacy degree by a distance between human figures (icons) having the same number as that of the viewers who are viewing the content, as illustrated in (a) to (f) of FIG. 16E. Here, the viewer determining unit 112 determines the number of viewers.

As such, even when more than three viewers is viewing a content, not only the intimacy degree as a whole but also each relationship between viewers can be represented by indicating the intimacy degree using the human figures (icons) having the same number as that of the viewers who are viewing the content.

Although a category image indicating only one of the social relationship and the intimacy degree is displayed on the content display apparatus 21 as illustrated in FIGS. 16B to 16E according to Modification 2, a category image indicating both the social relationship and the intimacy degree may be displayed thereon.

(Modification 3)

Here, Modification 3 of the embodiment will be described. A viewing statistics-processing system according to Modification 3 is characterized by displaying an overview of thumbnails of ranked contents on the content display apparatus 21.

Figure 17:
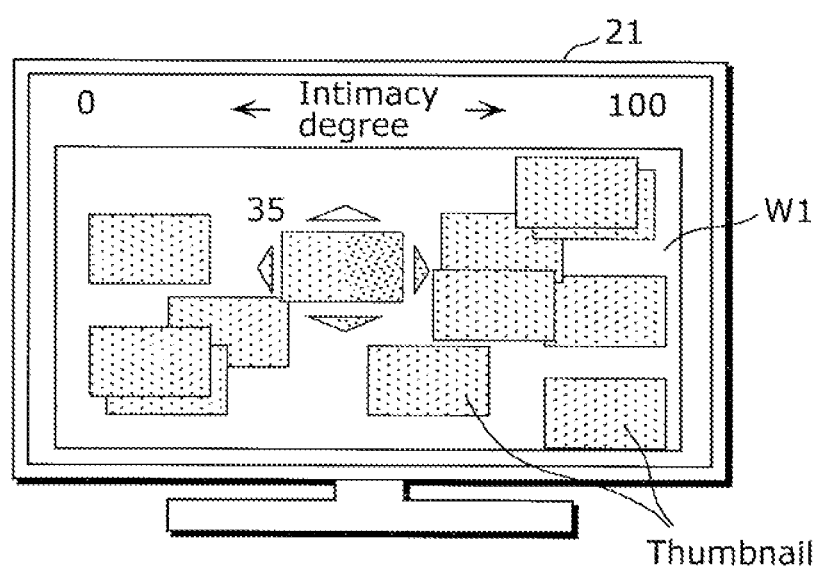
FIG. 17 illustrates a display example of viewing statistics information according to Modification 3 in the embodiment of the present invention.

FIG. 17 illustrates a display example of the viewing statistics information according to Modification 3.

When more than one viewer is viewing a content, upon receipt of a statistics display operation by the viewers, the display control unit 115 according to Modification 3 causes the content display apparatus 21 to display an overview of thumbnails of ranked contents as illustrated in FIG. 17. In other words, the display control unit 115 causes the content display apparatus 21 to display a window w1, and thumbnails within the window w1. For example, the horizontal axis indicates the intimacy degree, and the vertical axis indicates the rank. According to operations of a remote controller by the viewer, the display control unit 115 selects one of the displayed thumbnails, and puts the cursor on the selected thumbnail. Then, with the enter button of the remote controller pressed by the user, the display control unit 115 causes the content display apparatus 21 to display the content image corresponding to the thumbnail on which the cursor is put.

As described above, since the overview of the ranked contents is displayed according to Modification 3, the viewer can easily understand the contents ranked according to the intimacy degree between the viewers who are viewing the content, and the contents ranked according to any intimacy degree different from the intimacy degree.

Although the horizontal axis of the window w1 indicates the intimacy degree in Modification 3, the vertical axis may indicate the intimacy degree, and the thumbnails may be concentrically displayed.

(Modification 4)

Here, Modification 4 of the embodiment will be described. A viewing statistics-processing system according to Modification 4 is characterized by displaying, on the content display apparatus 21, an overview of thumbnails of ranked contents for each variation in viewer categories or viewer attributes. For example, the variation in the viewer categories indicates a variation in intimacy degrees; and the variation in the viewer attributes indicates a variation in emotions.

In the viewing terminal apparatus 110 according to Modification 4, when more than one viewer is viewing a content, the viewer determining unit 112 determines an intimacy degree at the start of displaying a content, and determines an intimacy degree at the completion of displaying the content. Next, the viewer determining unit 112 determines a difference in intimacy degree between the start and the completion of displaying the content as a variation in the intimacy degrees. Then, the viewing status information generating unit 113 generates the viewing status information indicating the variation in the intimacy degrees and the viewed content that are associated with each other. The terminal communicating unit 116 transmits the viewing status information to the viewing statistics-gathering apparatus 120.

Furthermore, in the viewing terminal apparatus 110 according to Modification 4, when one viewer is viewing a content, the viewer determining unit 112 specifies an emotion of the viewer at the start of displaying the content, and specifies an emotion of the viewer at the completion of displaying the content. The emotions of the viewer can be specified using the images captured by the sensing unit 111, and for example, using the technique of recognizing facial expressions disclosed in Patent Reference 7 ("DEVICE FOR RECOGNIZING FACIAL EXPRESSION", Japanese Unexamined Patent Application Publication No. 2839855) or Patent Reference 8 ("METHOD FOR RECOGNIZING EXPRESSION FROM FACE MOVING IMAGE", Japanese Unexamined Patent Application Publication No. 2962549). For example, the emotions are indicated by, for example, a first value representing joy, a second value representing anger, a third value representing sadness, and a fourth value representing enjoyment.

Next, the viewer determining unit 112 determines a difference in emotion between the start and the completion of displaying the content as a variation in the emotions. In other words, the viewer determining unit 112 specifies differences in first to fourth values between the start and the completion of displaying the content as variations in the emotions. Then, the viewing status information generating unit 113 generates the viewing status information indicating the variation in the emotions and the viewed content that are associated with each other. The terminal communicating unit 116 transmits the viewing status information to the viewing statistics-gathering apparatus 120.

In the viewing statistics-gathering apparatus 120 according to Modification 4, the viewing statistics information generating unit 122 gathers statistics on viewing of a content only by viewers having a variation in one of intimacy degrees and emotions, based on the viewing status information indicating the variation in one of intimacy degrees and emotions, and generates the viewing statistics information indicating a result of the statistics.

Figure 18A:
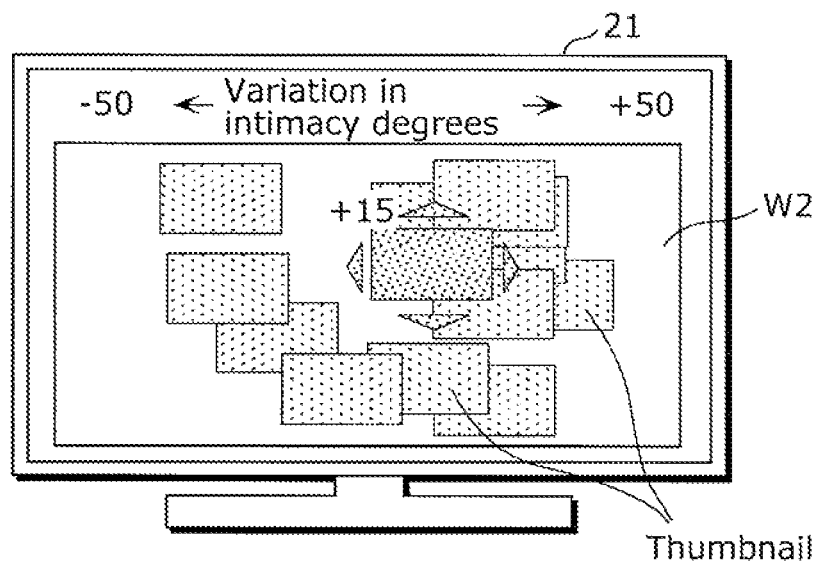
FIG. 18A illustrates a display example of viewing statistics information according to Modification 4 in the embodiment of the present invention.

FIG. 18A illustrates a display example of the viewing statistics information according to Modification 4.

When more than one viewer is viewing a content, upon receipt of a statistics display operation by the viewers, the display control unit 115 according to Modification 4 causes the content display apparatus 21 to display an overview of thumbnails of ranked contents as illustrated in FIG. 18A. In other words, the display control unit 115 causes the content display apparatus 21 to display a window w2, and the thumbnails within the window w2. For example, in the window w2, the horizontal axis indicates the variation in the intimacy degrees, and the vertical axis indicates the rank.

Figure 18B:
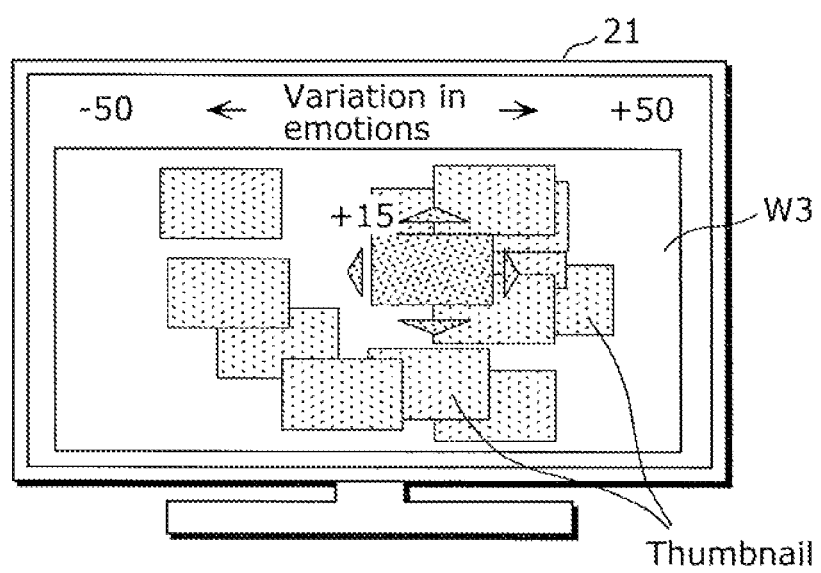
FIG. 18B illustrates another display example of viewing statistics information according to Modification 4.

FIG. 18B illustrates another display example of the viewing statistics information according to Modification 4.

When one viewer is viewing a content, upon receipt of a statistics display operation from the viewer, the display control unit 115 according to Modification 4 causes the content display apparatus 21 to display the overview of thumbnails of ranked contents as illustrated in FIG. 18B. In other words, the display control unit 115 causes the content display apparatus 21 to display a window w3, and the thumbnails within the window w3. For example, in the window w3, the horizontal axis indicates the variation in emotions, and the vertical axis indicates the rank.

In Modification 4, similarly to Modification 3, the display control unit 115 selects one of the displayed thumbnails, and puts the cursor on the selected thumbnail, according to operations of a remote controller by the viewer. Then, with the enter button of the remote controller pressed by the user, the display control unit 115 causes the content display apparatus 21 to display the content image corresponding to the thumbnail on which the cursor is put.

As described in Modification 4, an overview of thumbnails of contents ranked according to a variation in intimacy degrees or a variation in emotions is displayed on the content display apparatus 21. Thereby, when the user desires to enjoy viewing a content, the user can select a content having a higher degree of transition to an amusing state, and view the selected content. Furthermore, when viewers desire to be on intimate terms with each other through viewing a content, they can select a content with which the intimacy degree will significantly increase, and view the selected content.

Furthermore, since an overview of ranked contents is displayed according to Modification 4 in the same manner as Modification 3, a viewer can easily understand contents ranked according to a variation in intimacy degrees of viewers who are viewing a content, and contents ranked according to any variation in intimacy degrees different from the former variation in intimacy degrees. Furthermore, a viewer can easily understand contents ranked according to a variation in emotions of viewers who are viewing a content, and contents ranked according to any variation in emotions different from the former variation in emotions.

Although Modification 4 handles, as a variation, a difference in intimacy degree or emotion between the start and the completion of displaying a content, the intimacy degrees or the emotions may be regularly determined during when the content is displayed, and an average value of variations in the determined intimacy degrees or emotions may be handled as a variation.

Although the viewing statistics-processing system according to the present invention is described based on the embodiment and Modifications, obviously, the present invention is not limited to these.

For example, although the sensing unit 111 is a capturing apparatus (camera) in the embodiment and Modifications, it may function as a sound pickup device (microphone). The sensing unit 111 that is a microphone is placed at a position as illustrated in FIGS. 5A, 5B, and 5C. Here, the viewer determining unit 112 specifies a social relationship and a viewer attribute based on, for example, a voice print, instead of images. For example, the viewer determining unit 112 specifies a social relationship and a viewer attribute by comparing a voice print of voice picked up by a microphone with a pre-registered voice print. Alternatively, the viewer determining unit 112 specifies a social relationship and a viewer attribute based on a keyword, such as "dad" or "mom" included in voice (conversation) picked up by a microphone. For example, Patent Reference 9 ("KEYWORD EXTRACTING DEVICE", International Publication WO 2008/126355) discloses such a method of extracting a keyword in a conversation.

Furthermore, when the sensing unit 111 is composed of microphones, the viewer determining unit 112 may locate positions of voices, that is, positions of viewers, using a phase difference in the voices and others, and specify a physical distance between the viewers based on the positions.

Furthermore, when the sensing unit 111 is a microphone, the viewer determining unit 112 may specify a psychological distance between viewers based on an amount of conversation between the viewers that is obtained from voices of the viewers picked up by the microphone. The amount of conversation is at least one of a volume of the conversation and a time period of the conversation. Alternatively, the viewer determining unit 112 may detect laugh from the voices of viewers, and specify a psychological distance between the viewers based on at least one of a volume of the laugh and a duration of the laugh. For example, Patent Reference 10 ("VOICE PROCESSOR, MOVING PICTURE PROCESSOR, VOICE AND MOVING PICTURE PROCESSOR, AND RECORDING MEDIUM WITH VOICE AND MOVING PICTURE PROCESSING PROGRAM RECORDED", Japanese Unexamined Patent Application Publication No. 2002-006874) discloses such a method of extracting laugh. The viewer determining unit 112 may specify a variation in psychological distances, that is, a variation in intimacy degrees, based on the psychological distance specified in such a manner.

Furthermore, the viewer determining unit 112 may specify an emotion of a viewer and a variation in emotions, based on at least one of a volume of the laugh and a duration of the laugh. Furthermore, the sensing unit 111 may be an obtaining unit including both a camera and a microphone.

Furthermore, although the viewing terminal apparatus 110 includes the sensing unit 111 in the embodiment and Modifications, the viewing terminal apparatus 110 may include a user input unit instead of the sensing unit 111. The user input unit is, for example, a remote controller, a wireless receiving unit, a keyboard, an operation panel, or a voice recognition device. In other words, the viewer determining unit 112 specifies the number of viewers, a viewer category, a viewer attribute, and others according to one of an input operation and a voice input performed by a user on the user input unit.

Furthermore, although the viewing statistics-gathering apparatus 120 is connected to the viewing terminal apparatuses 110 via the Internet in the embodiment and Modifications, they may be connected through other communication media. Furthermore, the viewing statistics-gathering apparatus 120 may be included in a transmitting apparatus (broadcasting apparatus) that transmits a content. Here, a communication medium between the viewing statistics-gathering apparatus 120 and the viewing terminal apparatuses 110 may be identical to a communication medium for transmitting (broadcasting) the content. Furthermore, although the viewing terminal apparatus 110 is connected to the content display apparatus 21 in the embodiment and Modifications, the viewing terminal apparatus 110 may be included in the content display apparatus 21.

Furthermore, although the viewing terminal apparatus 110 causes the content display apparatus 21 to display details of the viewing statistics information according to a statistics display operation performed by a viewer in the embodiment and Modifications, the details may be automatically displayed on the content display apparatus 21, regardless of the operation. For example, when a degree of interest of viewers in a content displayed on the content display apparatus 21 becomes lower than a threshold, the display control unit 115 causes the content display apparatus 21 to display details of the viewing statistics information. In order to specify a degree of interest, the display control unit 115 may detect a direction of a line of sight based on, for example, a captured image obtained by the sensing unit 111, and specify a time period for which the user continues to gaze at a content displayed on the content display apparatus 21, as the degree of interest.

Furthermore, although the viewing terminal apparatus 110 causes the content display apparatus 21 to display details of the viewing statistics information as a statistics image in the embodiment and Modifications, the viewing terminal apparatus 110 may inform the viewer of the details not by an image but by voice. Here, the viewing terminal apparatus 110 causes a speaker included in the content display apparatus 21 to output voice for informing the details of the viewing statistics information. Alternatively, the viewing terminal apparatus 110 may include a display unit, such as a liquid crystal display, and the display control unit 115 may cause the display unit to display the details of the viewing statistics information. Alternatively, the viewing terminal apparatus 110 may include a remote controller for operating the viewing terminal apparatus 110, and the display control unit 115 may cause a display unit included in the remote controller to display the details of the viewing statistics information. Alternatively, the display control unit 115 may cause a display unit included in a remote controller of the content display apparatus 21 to display the details of the viewing statistics information. Here, a statistics image displayed on the content display apparatus 21 may be vertically-long rectangle and horizontally-long rectangle, and the statistics image may be of any shape.

Furthermore, although the viewing terminal apparatus 110 indicates a viewer attribute and a viewer category specified by a user through an attribute specification operation and a category specification operation, respectively, by using positions of pointers or the sizes of tabs in the embodiment and Modifications, the viewer attribute and the viewer category may be indicated by other Graphical User Interfaces (GUIs). Furthermore, although the viewing terminal apparatus 110 receives an operation, such as an attribute specification operation and a category specification operation, with a button of a remote controller pressed or voice input to a microphone in the embodiment and Modifications, the viewing terminal apparatus 110 may receive an operation from the user through other actions. Here, when receiving an operation from the user with a button of a remote controller pressed, the viewing terminal apparatus 110 includes a wireless signal receiving unit that receives a wireless signal transmitted from the remote controller. Furthermore, when receiving an operation from the user with voice input to a microphone, the viewing terminal apparatus 110 includes a voice recognition device that recognizes the microphone and voices picked up by the microphone.

Furthermore, although the viewing terminal apparatus 110 generates viewing status information and transmits the viewing status information to the viewing statistics-gathering apparatus 120 at the start of displaying a content on the content display apparatus 21 in the embodiment and Modifications, the viewing terminal apparatus 110 may generate and transmit the viewing status information with another timing. For example, the viewing terminal apparatus 110 may generate viewing status information and transmits the viewing status information to the viewing statistics-gathering apparatus 120 at the completion of displaying the content on the content display apparatus 21 or prior to the completion.

Furthermore, although the viewing statistics-gathering apparatus 120 generates or updates viewing statistics information upon receipt of the viewing status information from the viewing terminal apparatus 110 in the embodiment and Modifications, the viewing statistics-gathering apparatus 120 may generate or update the viewing statistics information with another timing (for example, regular timing).

Furthermore, although the viewing terminal apparatus 110 requests the viewing statistics-gathering apparatus 120 to issue the latest viewing statistics information upon receipt of the statistics display operation from a viewer and obtains the information in the embodiment and Modifications, the viewing terminal apparatus 110 may request the viewing statistics-gathering apparatus 120 and obtain the viewing statistics information with another timing (for example, regular timing). Here, upon receipt of the statistics display operation from the viewer, the viewing terminal apparatus 110 causes the content display apparatus 21 to display details of the latest viewing statistics information that has been already obtained, without requesting the viewing statistics-gathering apparatus 120 to issue the viewing statistics information.

Furthermore, although the viewing terminal apparatus 110 determines the number of viewers, a viewer attribute, a viewer category, and others in the embodiment and Modifications, the viewing statistics-gathering apparatus 120 may determine these. In other words, the viewing terminal apparatus 110 does not include the viewer determining unit 112, and transmits, to the viewing statistics-gathering apparatus 120, a result of sensing (captured image or voice) by the sensing unit 111 and the viewing status information indicating the content that is being viewed. The viewing statistics-gathering apparatus 120 includes the viewer determining unit 112, and determines the number of viewers, a viewer attribute, a viewer category, and others based on the result of sensing indicated by the viewing status information. Thereby, even when the viewing statistics-gathering apparatus 120 includes the viewer determining unit 112, the same effects and advantages as those of the embodiment and Modifications can be obtained.

Furthermore, the viewing terminal apparatus 110 causes the content display apparatus 21 to display details of the viewing statistics information during when a viewer is viewing a content in the embodiment and Modifications. In other words, the details of the viewing statistics information are displayed in real time. However, even when the user is not viewing the content, the viewing terminal apparatus 110 may cause the content display apparatus 21 to display the details of the viewing statistics information upon receipt of a statistics display operation from the user.

Furthermore, a content may be not only broadcasted from a broadcast station at a predetermined time but also transmitted using a video on demand system in the embodiment and Modifications.

Furthermore, the viewer category may be at least one of a social relationship, an intimacy degree, a variation in the intimacy degrees, or may be any combination of these in the embodiment and Modifications. Furthermore, the intimacy degree may be one of a physical distance and a psychological distance.

Furthermore, although the viewing terminal apparatus 110 causes the content display apparatus 21 to display a statistics image indicating contents up to the third rank in the embodiment and Modifications, a statistics image indicating contents of the fourth rank or the lower ranks may be displayed thereon. Furthermore, the viewing terminal apparatus 110 may cause the content display apparatus 21 to display a statistics image indicating audience ratings of contents, together with ranks of the contents or instead of the ranks of the contents.

Furthermore, although the viewing terminal apparatus 110 determines viewer attributes (gender and age) or viewer categories (social relationship and intimacy degree) according to the number of viewers in the embodiment and Modifications, it may determine only a variation in emotions.

Furthermore, although the content is a television program in the embodiment and Modifications, the content is not limited to a television program but may be any data as long as the data includes video, music, or others.

Furthermore, the present invention may be configured as follows.

(1) Each of the above apparatuses is specifically a computer system including a micro processing unit, a ROM, a RAM, a hard disk unit, a display unit, a keyboard, and a mouse. A computer program is stored in the RAM or the hard disk unit. The micro processing unit operates according to the computer program, so that each of the apparatuses fulfills the function. Here, in order to fulfill a predetermined function, the computer program is programmed by combining instruction codes each indicating an instruction for a computer. Here, each of the above apparatuses is not limited to a computer system including all of a micro processing unit, a ROM, a RAM, a hard disk unit, a display unit, a keyboard, and a mouse, but may be a computer system including part of these.

(2) Part or all of the constituent elements included in each of the above apparatuses may be included in one system large scale integration (LSI). The system LSI is a super-multifunctional LSI manufactured by integrating the constituent elements on one chip and is, specifically, a computer system including a micro processing unit, a ROM, and a RAM. The computer program is stored in the RAM. The micro processing unit operates according to the computer program, so that the system LSI fulfills its function.

The name used here is system LSI, but it may also be called IC, LSI, super LSI, or ultra LSI depending on the degree of integration. Moreover, not only the LSI but also a special circuit, a general purpose processor, and so forth can also achieve the integration. Field Programmable Gate Array (FPGA) that can be programmed after manufacturing LSI or a reconfigurable processor that allows re-configuration of the connection or configuration of circuit cells within the LSI can be used for the same purpose.

Furthermore, if integrated circuit technology that replaces LSI appears thorough progress in semiconductor technology or other derived technology, that technology can naturally be used to carry out integration of the functional blocks. Application of biotechnology is one such possibility.

(3) Part or all of the constituent elements included in each of the above apparatuses may be included in an IC card removable from each of the apparatuses or in a stand alone module. The IC card or the module is a computer system including a micro processing unit, a ROM, and a RAM. The IC card or the module may include the above super-multi-functional LSI. The micro processing unit operates according to the computer program, so that the IC card or the module fulfills its function. The IC card or the module may have tamper-resistance.

(4) The present invention may be any of the above methods. Furthermore, the present invention may be a computer program which causes a computer to execute these methods, and a digital signal included In the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc (BD), and a semiconductor memory. In addition, the present invention may be the computer program or the digital signal recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transporting the recording medium, or by transmitting the computer program or the digital signal via a network and the like.

(5) The embodiment and Modifications may be combined.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

Each of the viewing terminal apparatus, the viewing statistics-gathering apparatus, and the viewing statistics-processing system according to the present invention has an advantage that an appropriate result of statistics on viewing of contents can be presented according to diversified viewing modes. For example, these apparatuses are useful as an apparatus, a system, and others that gather and provide information of viewers on a television program and others.

What is claimed is:

1. A viewing terminal apparatus that communicates, with a viewing statistics-gathering apparatus, information on viewing of a content, said viewing terminal apparatus comprising:
   a category determining unit configured to determine, as a viewer category, a relationship between viewers who are viewing a content displayed on a display;
   a transmitting unit configured to transmit, to the viewing statistics-gathering apparatus, first viewing status information indicating the content that is being viewed by the viewers and the viewer category determined by said category determining unit, the content being associated with the viewer category;
   a viewing statistics presenting unit configured to obtain viewing statistics information from the viewing statistics-gathering apparatus, and to present a result of statistics that is (i) indicated by the obtained viewing statistics information and (ii) a result of statistics on viewing of a content only by viewers who belong to a predetermined viewer category; and
   an obtaining unit configured to obtain at least one of images and voices of the viewers who are viewing the content displayed on the display,
   wherein said category determining unit is configured to determine the viewer category using the at least one of the images and the voices obtained by said obtaining unit.

2. The viewing terminal apparatus according to claim 1, further comprising:
   a number-of-persons determining unit configured to determine whether one or more than one viewer is viewing the content displayed on the display; and
   an attribute determining unit configured, when said number-of-persons determining unit determines that one viewer is viewing the content, to determine an attribute of the one viewer,
   wherein said transmitting unit is further configured to transmit, to the viewing statistics-gathering apparatus, second viewing status information indicating the content that is being viewed by the one viewer and the attribute of the one viewer determined by said attribute determining unit, the content being associated with the attribute, and
   said viewing statistics presenting unit is further configured to present a result of statistics that is (i) indicated by the obtained viewing statistics information and (ii) a result of statistics on viewing of a content only by viewers who belong to a predetermined attribute.

3. The viewing terminal apparatus according to claim 2, further comprising
   an obtaining unit configured to obtain at least one of an image and a voice of the one viewer who is viewing the content displayed on the display,
   wherein said attribute determining unit is configured to:
   specify a variation in emotions of the one viewer, based on the at least one of the image and the voice obtained by said obtaining unit, and
   determine the specified variation in the emotions as an attribute of the one viewer.

4. The viewing terminal apparatus according to claim 3, wherein the emotions are indicated by a first value representing joy, a second value representing anger, a third value representing sadness, and a fourth value representing enjoyment, and said attribute determining unit is configured to specify a variation in the first to fourth values as the variation in the emotions.

5. The viewing terminal apparatus according to claim 1, wherein said category determining unit is configured to determine, as the viewer category, an intimacy degree between the viewers who are viewing the content displayed on the display.

6. The viewing terminal apparatus according to claim 5, wherein said category determining unit is configured to:
specify at least one of a physical distance and a psychological distance between the viewers, based on the at least one of the images and the voices obtained by said obtaining unit; and
calculate the intimacy degree using the at least one of the physical distance and the psychological distance that is specified.

7. The viewing terminal apparatus according to claim 6, wherein said category determining unit is configured to:
measure a time period for which the viewers are smiling, based on the images obtained by said obtaining unit; and
calculate the intimacy degree using the measured time period as the psychological distance.

8. The viewing terminal apparatus according to claim 6, wherein said category determining unit is configured to:
measure a time period for which the viewers are making a conversation, based on the voices obtained by said obtaining unit; and
calculate the intimacy degree using the measured time period as the psychological distance.

9. The viewing terminal apparatus according to claim 6, wherein said category determining unit is configured to:
count at least the number of occurrences that the viewers see each other face-to-face or the number of occurrences that the viewers gaze at each other, based on the images obtained by said obtaining unit; and
calculate the intimacy degree using the counted number of occurrences as the psychological distance.

10. The viewing terminal apparatus according to claim 1, wherein said category determining unit is configured to determine, as the viewer category, a variation in an intimacy degree between the viewers who are viewing the content displayed on the display.

11. The viewing terminal apparatus according to claim 1, wherein said category determining unit is configured to determine, as the viewer category, a social relationship between the viewers who are viewing the content displayed on the display.

12. The viewing terminal apparatus according to claim 1, wherein said viewing statistics presenting unit is configured to present, as the result of the statistics, a list of contents ranked in descending order of the number of times only the viewers who belong to the predetermined viewer category view the contents.

13. The viewing terminal apparatus according to claim 12, wherein said viewing statistics presenting unit is configured to present the list of the contents that is the result of the statistics gathered from only the viewers who belong to the viewer category determined by said category determining unit.

14. A viewing statistics-gathering apparatus that gathers statistics on viewing of a content, said apparatus comprising:
a receiving unit configured to receive viewing status information from each of a plurality of viewing terminal apparatuses including one viewing terminal apparatus that obtains at least one of images and voices of the viewers who are viewing the content displayed on the display, and determines the viewer category indicated by the viewing status information using the at least one of the images and the voices that are obtained, the viewing status information indicating a content that is being viewed by viewers and the viewer category indicating a relationship between the viewers, the content being associated with the viewer category;
a viewing statistics information generating unit configured to generate viewing statistics information indicating a result of statistics on viewing of the content only by viewers who belong to a predetermined viewer category, based on the viewing status information of each of the viewing terminal apparatuses that is received by said receiving unit; and
a providing unit configured to provide at least one of the viewing terminal apparatuses with the viewing statistics information generated by said viewing statistics information generating unit.

15. A viewing statistics-processing system, comprising:
a viewing statistics-gathering apparatus that gathers statistics on viewing of a content; and
viewing terminal apparatuses that communicate information on viewing of a content with said viewing statistics-gathering apparatus;
wherein each of said viewing terminal apparatuses includes
a category determining unit configured to determine, as a viewer category, a relationship between viewers who are viewing a content displayed on a display,
a transmitting unit configured to transmit, to said viewing statistics-gathering apparatus, viewing status information indicating the content that is being viewed by the viewers and the viewer category determined by said category determining unit, the content being associated with the viewer category,
a viewing statistics presenting unit configured to obtain viewing statistics information from said viewing statistics-gathering apparatus, and to present a result of statistics that is (i) indicated by the obtained viewing statistics information and (ii) a result of statistics on viewing of a content only by viewers who belong to a predetermined viewer category, and
an obtaining unit configured to obtain at least one of images and voices of the viewers who are viewing the content displayed on display,
said category determining unit being configured to determine the viewer category using the at least one of the images and the voices obtained by said obtaining unit; and
wherein said viewing statistics-gathering apparatus includes
a receiving unit configured to receive the viewing status information from each of said viewing terminal apparatuses,
a viewing statistics information generating unit configured to generate the viewing statistics information, based on the viewing status information of each of said viewing terminal apparatuses that is received by said receiving unit, and
a providing unit configured to provide at least one of said viewing terminal apparatuses with the viewing statistics information generated by said viewing statistics information generating unit.

16. A viewing statistics-processing method of gathering statistics on viewing of a content by communicating information on viewing of a content in a viewing statistics-processing system including a viewing statistics-gathering apparatus and viewing terminal apparatuses, wherein, in each of the viewing terminal apparatuses, said method comprises determining, as a viewer category, a relationship between viewers who are viewing a content displayed on a display, transmitting, to the viewing statistics-gathering apparatus, viewing status information indicating the content that is being viewed by the viewers and the viewer category determined in said determining, the content being associated with the viewer category, and obtaining viewing statistics information from the viewing statistics-gathering apparatus, and presenting a result of statistics that is (i) indicated by the obtained viewing statistics information and (ii) a result of statistics on viewing of a content only by viewers who belong to a predetermined viewer category, and obtaining at least one of images and voices of the viewers who are viewing the content displayed on the display, wherein, in said determining, the viewer category is determined using the at least one of the images and the voices obtained in said obtaining of at least one of images and voices; and wherein, in the viewing statistics-gathering apparatus, said method comprises receiving the viewing status information from each of the viewing terminal apparatuses, generating the viewing statistics information, based on the viewing status information of each of the viewing terminal apparatuses that is received in said receiving, and providing at least one of the viewing terminal apparatuses with the viewing statistics information generated in said generating.

17. A program that is stored in a non-transitory recording medium, for a viewing terminal apparatus that communicates information on viewing of a content with a viewing statistics-gathering apparatus, said program causing a computer to execute:

determining, as a viewer category, a relationship between viewers who are viewing a content displayed on a display;

transmitting, to the viewing statistics-gathering apparatus, viewing status information indicating the content that is being viewed by the viewers and the viewer category determined in the determining, the content being associated with the viewer category;

obtaining viewing statistics information from the viewing statistics-gathering apparatus, and presenting a result of statistics that is (i) indicated by the obtained viewing statistics information and (ii) a result of statistics on viewing of a content only by viewers who belong to a predetermined viewer category; and obtaining at least one of images and voices of the viewers who are viewing the content displayed on the display, wherein, in the determining, the viewer category is determined using the at least one of the images and the voices obtained in the obtaining of at least one of images and voices.

18. A non-transitory computer-readable recording medium on which a program, for a viewing terminal apparatus that communicates information on viewing of a content with a viewing statistics-gathering apparatus, is stored, the program causing a computer to execute:

determining, as a viewer category, a relationship between viewers who are viewing a content displayed on a display;

transmitting, to the viewing statistics-gathering apparatus, viewing status information indicating the content that is being viewed by the viewers and the viewer category determined in the determining, the content being associated with the viewer category;

obtaining viewing statistics information from the viewing statistics-gathering apparatus, and presenting a result of statistics that is (i) indicated by the obtained viewing statistics information and (ii) a result of statistics on viewing of a content only by viewers who belong to a predetermined viewer category; and obtaining at least one of images and voices of the viewers who are viewing the content displayed on the display, wherein, in the determining, the viewer category is determined using the at least one of the images and the voices obtained in the obtaining of at least one of images and voices.

19. An integrated circuit that communicates information on viewing of a content with a viewing statistics-gathering apparatus, said integrated circuit comprising:

a category determining unit configured to determine, as a viewer category, a relationship between viewers who are viewing a content displayed on a display;

a transmitting unit configured to transmit, to the viewing statistics-gathering apparatus, viewing status information indicating the content that is being viewed by the viewers and the viewer category determined by said category determining unit, the content being associated with the viewer category;

a viewing statistics presenting unit configured to obtain viewing statistics information from the viewing statistics-gathering apparatus, and to present a result of statistics that is (i) indicated by the obtained viewing statistics information and (ii) a result of statistics on viewing of a content only by viewers who belong to a predetermined viewer category; and an obtaining unit configured to obtain at least one of images and voices of the viewers who are viewing the content displayed on the display, wherein said category determining unit is configured to determine the viewer category using the at least one of the images and the voices obtained by said obtaining unit.

\* \* \* \* \*